United States Patent
Bebis et al.

(10) Patent No.: US 9,042,606 B2
(45) Date of Patent: May 26, 2015

(54) HAND-BASED BIOMETRIC ANALYSIS

(75) Inventors: George Bebis, Reno, NV (US); Gholamreza Amayeh, Reno, NV (US)

(73) Assignee: Board of Regents of the Nevada System of Higher Education, Reno, NV (US)

( * ) Notice: Subject to any disclaimer, the term of this patent is extended or adjusted under 35 U.S.C. 154(b) by 1264 days.

(21) Appl. No.: 11/820,474

(22) Filed: Jun. 18, 2007

(65) Prior Publication Data

US 2010/0021014 A1    Jan. 28, 2010

Related U.S. Application Data

(60) Provisional application No. 60/814,163, filed on Jun. 16, 2006.

(51) Int. Cl.
  G06K 9/00    (2006.01)
  G06K 9/34    (2006.01)

(52) U.S. Cl.
  CPC .................................. *G06K 9/00375* (2013.01)

(58) Field of Classification Search
  USPC .................................................. 382/115, 173
  See application file for complete search history.

(56) References Cited

U.S. PATENT DOCUMENTS

| | | | |
|---|---|---|---|
| 4,573,193 A | | 2/1986 | Shuto et al. |
| 4,661,913 A | | 4/1987 | Wu et al. |
| 4,720,869 A | * | 1/1988 | Wadia ............................ 382/115 |
| 4,736,203 A | * | 4/1988 | Sidlauskas ................... 340/5.53 |
| 4,896,363 A | * | 1/1990 | Taylor et al. ................... 382/125 |
| 5,335,288 A | * | 8/1994 | Faulkner ........................ 382/115 |
| 5,483,601 A | * | 1/1996 | Faulkner ........................ 382/115 |
| 5,559,895 A | * | 9/1996 | Lee et al. ....................... 382/119 |
| 5,642,431 A | | 6/1997 | Poggio et al. |
| 5,764,790 A | * | 6/1998 | Brunelli et al. ................ 382/118 |
| 5,828,769 A | * | 10/1998 | Burns ............................ 382/118 |
| 5,995,637 A | | 11/1999 | Petersen et al. |
| 5,995,639 A | | 11/1999 | Kado et al. |
| 6,047,090 A | * | 4/2000 | Makram-Ebeid .............. 382/257 |
| 6,157,731 A | * | 12/2000 | Hu et al. ........................ 382/119 |
| 6,219,639 B1 | * | 4/2001 | Bakis et al. .................... 704/246 |

(Continued)

OTHER PUBLICATIONS

Xiao-yong et al, "Multibiometrics based on Palmpring and Handgeometry", 2005, IEEE, pp. 1-5.*

(Continued)

*Primary Examiner* — Kathleen Y Dulaney
(74) *Attorney, Agent, or Firm* — Klarquist Sparkman, LLP

(57) ABSTRACT

Hand-based biometric analysis systems and techniques are described which provide robust hand-based identification and verification. An image of a hand is obtained, which is then segmented into a palm region and separate finger regions. Acquisition of the image is performed without requiring particular orientation or placement restrictions. Segmentation is performed without the use of reference points on the images. Each segment is analyzed by calculating a set of Zernike moment descriptors for the segment. The feature parameters thus obtained are then fused and compared to stored sets of descriptors in enrollment templates to arrive at an identity decision. By using Zernike moments, and through additional manipulation, the biometric analysis is invariant to rotation, scale, or translation or an in put image. Additionally, the analysis utilizes re-use of commonly-seen terms in Zernike calculations to achieve additional efficiencies over traditional Zernike moment calculation.

38 Claims, 21 Drawing Sheets

Hand-Based Biometric Analysis Example 200

(56) References Cited

U.S. PATENT DOCUMENTS

| | | | |
|---|---|---|---|
| 6,226,417 B1 | 5/2001 | Yamagata et al. | |
| 6,370,263 B1 | 4/2002 | Hiratsuka et al. | |
| 6,445,810 B2 | 9/2002 | Darrell et al. | |
| 6,631,204 B1 | 10/2003 | Smith | |
| 6,681,032 B2 * | 1/2004 | Bortolussi et al. | 382/118 |
| 6,819,782 B1 | 11/2004 | Imagawa et al. | |
| 6,873,713 B2 | 3/2005 | Okazaki et al. | |
| 6,961,450 B2 * | 11/2005 | Takhiri et al. | 382/115 |
| 7,043,094 B2 | 5/2006 | Thomas et al. | |
| 7,212,671 B2 | 5/2007 | Kim et al. | |
| 7,215,796 B2 | 5/2007 | Mizoguchi | |
| 7,318,051 B2 | 1/2008 | Weston et al. | |
| 7,426,301 B2 | 9/2008 | Porikli | |
| 7,616,784 B2 * | 11/2009 | Kocher | 382/115 |
| 7,623,685 B2 * | 11/2009 | Boult et al. | 382/115 |
| 7,715,600 B2 * | 5/2010 | Avni et al. | 382/119 |
| 7,864,987 B2 * | 1/2011 | Venkatanna et al. | 382/115 |
| 7,912,246 B1 | 3/2011 | Moon et al. | |
| 7,983,451 B2 * | 7/2011 | Super et al. | 382/115 |
| 8,243,999 B2 | 8/2012 | Tobin, Jr. et al. | |
| 8,655,084 B2 * | 2/2014 | Bebis et al. | 382/224 |
| 2002/0089413 A1 | 7/2002 | Heger et al. | |
| 2004/0017934 A1 * | 1/2004 | Kocher | 382/125 |
| 2004/0057604 A1 | 3/2004 | David et al. | |
| 2004/0088553 A1 | 5/2004 | Levin et al. | |
| 2004/0151346 A1 * | 8/2004 | Weiss | 382/115 |
| 2004/0161136 A1 * | 8/2004 | McClurg et al. | 382/124 |
| 2004/0165753 A1 * | 8/2004 | Takhiri et al. | 382/115 |
| 2004/0215615 A1 * | 10/2004 | Larsson et al. | 707/9 |
| 2004/0264742 A1 * | 12/2004 | Zhang et al. | 382/115 |
| 2005/0084138 A1 * | 4/2005 | Inkster et al. | 382/115 |
| 2005/0106536 A1 | 5/2005 | Liebermann | |
| 2005/0111703 A1 * | 5/2005 | Merbach et al. | 382/116 |
| 2005/0131847 A1 | 6/2005 | Weston et al. | |
| 2005/0157909 A1 * | 7/2005 | Griffin | 382/115 |
| 2005/0207633 A1 | 9/2005 | Arini et al. | |
| 2005/0238207 A1 | 10/2005 | Tavares | |
| 2006/0034492 A1 | 2/2006 | Siegel et al. | |
| 2006/0039593 A1 | 2/2006 | Sammak et al. | |
| 2006/0078170 A1 | 4/2006 | Kamata et al. | |
| 2006/0147094 A1 * | 7/2006 | Yoo | 382/117 |
| 2006/0171571 A1 | 8/2006 | Chan et al. | |
| 2006/0177113 A1 | 8/2006 | Wrage | |
| 2006/0245624 A1 * | 11/2006 | Gallagher et al. | 382/118 |
| 2007/0014444 A1 * | 1/2007 | Nordin | 382/125 |
| 2007/0098223 A1 | 5/2007 | Kamata et al. | |
| 2007/0116331 A1 * | 5/2007 | Rowe et al. | 382/127 |
| 2007/0126733 A1 | 6/2007 | Yang et al. | |
| 2007/0201727 A1 * | 8/2007 | Birrell et al. | 382/115 |
| 2007/0274574 A1 * | 11/2007 | Boult et al. | 382/119 |
| 2008/0002892 A1 | 1/2008 | Jelonek et al. | |
| 2008/0056539 A1 * | 3/2008 | Sweeney et al. | 382/115 |
| 2008/0080744 A1 * | 4/2008 | Tanaka | 382/118 |
| 2009/0028434 A1 | 1/2009 | Vanhoucke et al. | |
| 2009/0034805 A1 * | 2/2009 | Perlmutter et al. | 382/118 |
| 2009/0074259 A1 * | 3/2009 | Baltatu et al. | 382/118 |

OTHER PUBLICATIONS

Agarwal et al., "Learning to Detect Objects in Images Via a Sparse, Part-Based Representation," *IEEE Trans. on Pattern Analysis and Machine Intelligence*, vol. 26, No. 11, pp. 1475-1490 (2004).

Amayeh et al, "A Component-Based Approach to Hand Verification," *IEEE Workshop on Biometrics*, 8 pp. (Jun. 2007).

Amayeh et al., "A New Approach to Hand-Based Authentication," *SPIE Defense and Security Symp: Biometric Technology for Human Identification IV*, 9 pp. (Apr. 2007).

Amayeh et al., "Accurate and Efficient Computation of High Order Zernike Moments," *First Int'l Symp. on Visual Computing*, pp. 462-469 (Dec. 2005).

Amayeh et al., "Hand-Based Verification and Identification Using Palm-Finger Segmentation and Fusion," *Journal of Computer Vision and Image Understanding*, vol. 113, Issue 4, 41 pp. (Apr. 2009).

Amayeh et al., "Hand-Based Verification Using Palm-Finger Segmentation," 30 pp. (May 2006).

Amayeh et al., "Improving Hand-Based Verification Through Online Finger Template Update Based on Fused Confidences," *IEEE Int'l Conf. on Biometrics: Theory, Applications and Systems*, 6 pp. (2009).

Amayeh et al., "Peg-Free Hand Shape Verification Using High Order Zernike Moments," *IEEE Workshop on Multi-modal Biometrics*, 8 pp. (Jun. 2006).

Belkasim et al., "Efficient Algorithm for Fast Computation of Zernike Moments," *IEEE Symp. on Circuits and Systems*, vol. 3, pp. 1401-1404 (Aug. 1996).

Bulatov et al., "Hand Recognition Using Geometric Classifiers," *Int'l Conf. on Biometric Authentication*, pp. 753-759 (Jul. 2004).

Cheung et al., "A Two-Level Fusion Approach to Multimodal Biometric Verification," *IEEE Int'l Conf. on Acoustics, Speech, and Signal Processing*, vol. 5, pp. 485-488 (Mar. 2005).

Erol et al., "Visual Hull Construction Using Adaptive Sampling," *IEEE Workshop on Applications of Computer Vision*, 8 pp. (Jan. 2005).

"The GNU Multiple Precision Arithmetic Library," Edition 5.0.1, 144 pp. (Feb. 6, 2010).

Gu et al., "A Novel Algorithm for Fast Computation of Zernike Moments," *Pattern Recognition*, vol. 35, pp. 2905-2911 (2002).

Heisele, "Visual Object Recognition with Supervised Learning," *IEEE Intelligent Systems*, pp. 38-42 (May/Jun. 2003).

Ingersoll-Rand, plc, printouts from World Wide Web, 5 pages (downloaded Mar. 11, 2011).

Jain et al., "A Prototype Hand Geometry-based Verification System," *Proc. 2nd Int'l Conf. on Audio- and Video-Based Personal Authentication*, pp. 166-171 (Mar. 1999).

Jain et al., "Deformable Matching of Hand Shapes for Verification," *Proc. IEEE Int'l Conf. on Image Processing*, pp. 857-861 (Oct. 1999).

Jiang et al., "Information Fusion in Face and Fingerprint Identity Verification System," *3rd Int'l Conf. on Machine Learning and Cybernetics*, pp. 3529-3535 (Aug. 2004).

Jiang et al., "Online Fingerprint Template Improvement," *IEEE Trans. on Pattern Analysis and Machine Intelligence*, vol. 24, No. 8, pp. 1121-1126 (Aug. 2002).

Khotanzad et al., "Invariant Image Recognition by Zernike Moments," *IEEE Trans. on Pattern Analysis and Machine Intelligence*, vol. 12, pp. 489-498 (1990).

Kittler et al., "On Combining Classifiers," *IEEE Trans. on Pattern Analysis and Machine Intelligence*, vol. 20, pp. 226-239 (1998).

Kumar et al., "Personal Recognition Using Hand Shape and Texture," *IEEE Trans. on Image Processing*, vol. 15, pp. 2454-2461 (Aug. 2006).

Kumar et al., "Personal Verification using Palmprint and Hand Geometry Biometric," *Time-Varying Image Processing and Moving Object Recognition*, pp. 668-678 (Jun. 2003).

Lay, "Hand Shape Recognition," *Optics and Laser Technology*, vol. 32, pp. 1-5 (Feb. 2000).

Liao et al., "On the Accuracy of Zernike Moments for Image Analysis," *IEEE Trans. on Pattern Analysis and Machine Intelligence*, vol. 20, No. 12, pp. 1358-1364 (Dec. 1998).

Liu et al., "Eigenspace Updating for Non-stationary Process and its Application to Face Recognition," *Pattern Recognition*, pp. 1945-1959 (2003).

Ma et al., "Using B-Spline Curves for Hand Recognition," *Proc. 17th Int'l Conf. on Pattern Recognition*, vol. 3, pp. 274-277 (Aug. 2004).

Mohan et al., "Example-Based Object Detection in Images by Components," *IEEE Trans. on Pattern Analysis and Machine Intelligence*, vol. 23, No. 4, pp. 349-361 (Apr. 2001).

Mukundan et al., "Fast Computation of Legendre and Zernike Moments," Pattern Recognition, vol. 28, No. 9, pp. 1433-1442 (1995).

Oden et al., "Combining Implicit Polynomials and Geometric Features for Hand Recognition," *Pattern Recognition Letters*, vol. 24, No. 13, pp. 2145-2152 (2003).

Osuna et al., "An Improved Training Algorithm for Support Vector Machines," *Proc. Neural Networks in Signal Processing*, 10 pp. (1997).

(56) References Cited

OTHER PUBLICATIONS

Phillips et al., "The FERET Evaluation Methodology for Face-Recognition Algorithms," *IEEE Trans. on Pattern Analysis and Machine Intelligence*, vol. 22, No. 10, pp. 1090-1104 (Oct. 2000).
Prokop et al., "A Survey of Moment Based Techniques for Unoccluded Object Representation," *Graph. Models Image Process*, vol. 54, No. 5, pp. 438-460 (1992).
Rattani et al., "Biometric Template Update Using the Graph Mincut Algorithm: A Case Study in Face Verification," *6th IEEE Biometrics Symposium*, pp. 23-28 (2008).
Ribaric et al., "Multimodal Biometric User-Identification System for Network-Based Applications," *IEEE Proc. on Vision, Image and Signal Processing*, vol. 150, pp. 409-416 (Dec. 2003).
Roli et al., "Semi-supervised PCA-based Face Recognition Using Self Training," *Int'l Workshop on Structural, Syntactic and Statistical Pattern Recognition*, pp. 560-568 (2006).
Ross et al., "Feature Level Fusion Using Hand and Face Biometrics," *SPIE Conf. on Biometrics Technology for Human Identification*, vol. 5779, No. 2, pp. 196-204 (Mar. 2005).
Ross et al., "Information Fusion in Biometrics," *Pattern Recognition Letters*, vol. 24, No. 13, pp. 2115-2125 (Sep. 2003).
Ryu et al., "Template Adaptation Based Fingerprint Verification," *The 18th Int'l Conf. on Pattern Recognition*, vol. 4, pp. 582-585 (2006).
Sanchez-Reillo et al., "Biometric Identification Through Hand Geometry Measurements," *IEEE Trans. on Pattern Analysis and Machine Intelligence*, vol. 22, No. 10, pp. 1168-1171 (Oct. 2000).
Sanchez-Reillo, "Hand Geometry Pattern Recognition Through Gaussian Mixture Modelling," *15th Int'l Conf. on Pattern Recognition*, vol. 2, pp. 937-940 (2000).
Schneiderman et al., "Object Detection Using the Statistics of Parts," *Int'l Journal of Computer Vision*, vol. 56, No. 3, pp. 151-177 (2004).
Sun et al., "Object Detection Using Feature Subset Selection," *Pattern Recognition*, vol. 37, pp. 2165-2176 (2004).
Tavakkoli et al., "Incremental SVDD Training: Improving Efficiency of Background Modeling in Videos," *Signal and Image Processing*, 6 pp. (2008).
Tax et al., "Support Vector Data Description," *Machine Learning*, vol. 54, No. 1, pp. 45-66 (2004).
Teague, "Image Analysis Via the General Theory of Moments," *J. Opt. Soc. Am.*, vol. 70, Issue 8, pp. 920-930 (1980).
Teh et al., "On Image Analysis by the Methods of Moments," *IEEE Trans. on Image Analysis and Machine Intelligence*, vol. 10, No. 4, pp. 496-513 (1988).
Uludag et al., "Biometric Template Selection and Update: a Case Study in Fingerprints," *Pattern Recognition*, vol. 37, pp. 1533-1542 (2003).
Wong et al., "Peg-Free Hand Geometry Recognition Using Hierarchical Geometry and Shape Matching," *IAPR Workshop on Machine Vision Applications*, pp. 281-284 (2002).
Woodard et al., "Finger Surface as a Biometric Identifier," *Computer Vision and Image Understanding*, vol. 100, pp. 357-384 (2005).
Woodard et al., "Personal Identification Utilizing Finger Surface Features," *IEEE Conf. on Computer Vision and Pattern Recognition*, vol. 2, pp. 1030-1036 (Jun. 2005).
Xiong et al., "Peg-Free Human Hand Shape Analysis and Recognition," *Proc. IEEE In'tl Conf. on Acoustics, Speech, and Signal Processing*, vol. 2, pp. 77-80 (Mar. 2005).
Yoruk et al., "Shape-Based Hand Recognition," *IEEE Trans. on Image Processing*, vol. 15, No. 7, pp. 1803-1815 (Jul. 2006).
Duda et al., *Pattern Classification*, 2nd ed., Chapters 5.11, 10, pp. 259-265, 517-598 (2000).
Gonzalez et al., *Digital Image Processing*, Sections 11.2 and 11.3, pp. 653-687 (2002).
Haralick et al., *Computer and Robot Vision*, Chapters 3 and 10, pp. 59-94 and 509-553 (1991).
Jain et al., *Biometrics: Personal Identification in Networked Society*, Chapter 4, pp. 87-102 (Jan. 1999).
Platt, "Fast Training of Support Vector Machines using Sequential Minimal Optimization," *Advances in Kernel Methods—Support Vector Learning*, MIT Press, pp. 185-208 (1998).
Platt, "Sequential Minimal Optimization: A Fast Algorithm for Training Support Vector Machines," Technical Report MSR-TR-98-14, 21 pp. (Apr. 1998).
Wadhwa, "The Promise of Biometric Technologies," International Biometric Group, 42 pp. (2004).
Zernike, "Beugungstheorie des Schneidenverfahrens und seiner verbesserten Form, der Phasenkontrastmethode," *Physica*, vol. 1, pp. 689-704 (1934).

\* cited by examiner

Hand-Based Biometric Analysis Example 200

Fig. 7
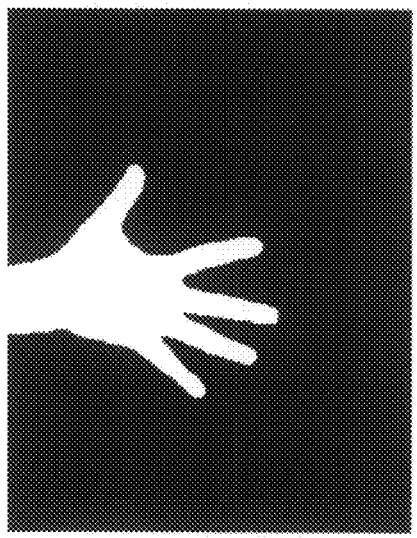
(a)
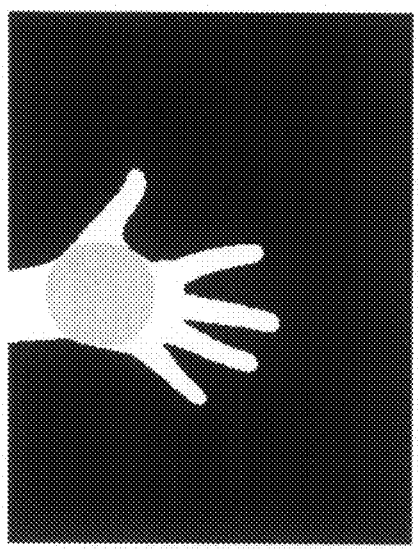
(b)
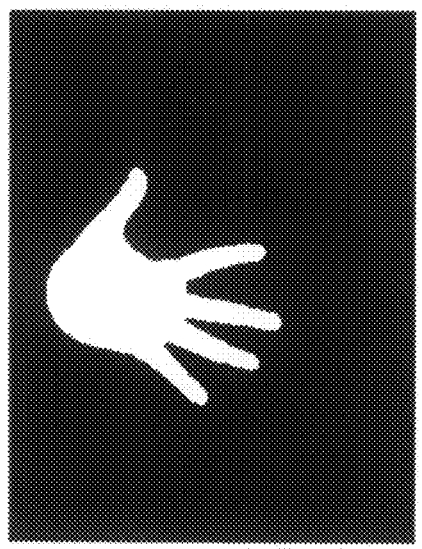
(c)

(a)  (b)
(c)  (d)

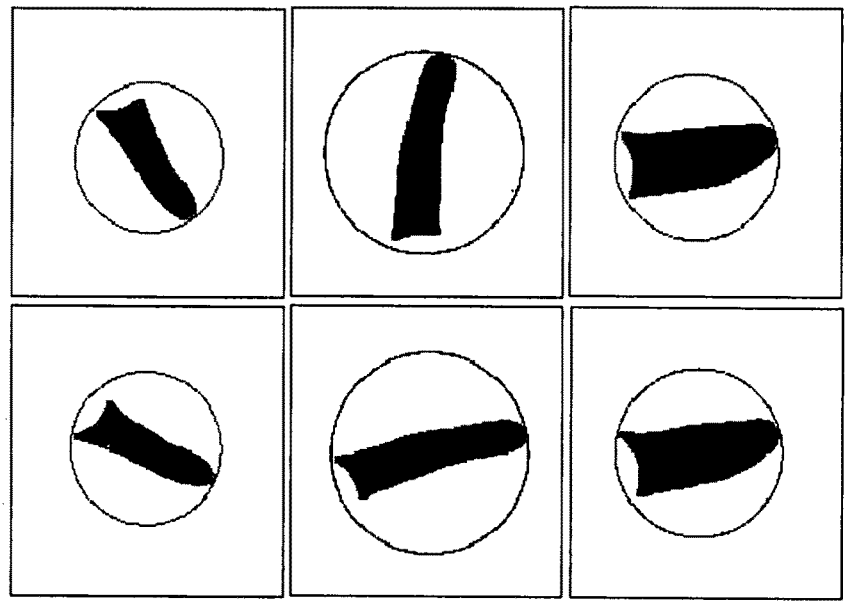
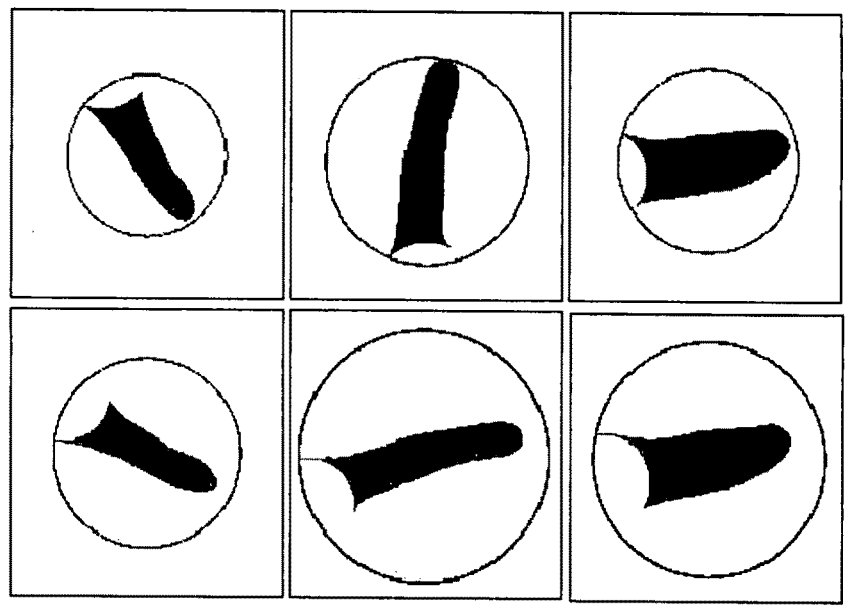
Fig. 12

Fig. 13

$$Z_{0,0} = \beta_{0,0,0}\,\chi_{0,0}$$
$$Z_{2,0} = \beta_{2,0,0}\,\chi_{0,0} + \beta_{2,0,2}\,\chi_{0,2}$$
$$Z_{4,0} = \beta_{4,0,0}\,\chi_{0,0} + \beta_{4,0,2}\,\chi_{0,2} + \beta_{4,0,4}\,\chi_{0,4}$$
$$Z_{6,0} = \beta_{6,0,0}\,\chi_{0,0} + \beta_{6,0,2}\,\chi_{0,2} + \beta_{6,0,4}\,\chi_{0,4} + \beta_{6,0,6}\,\chi_{0,6}$$
$$Z_{8,0} = \beta_{8,0,0}\,\chi_{0,0} + \beta_{8,0,2}\,\chi_{0,2} + \beta_{8,0,4}\,\chi_{0,4} + \beta_{8,0,6}\,\chi_{0,6} + \beta_{8,0,8}\,\chi_{0,8}$$
$$Z_{10,0} = \beta_{10,0,0}\,\chi_{0,0} + \beta_{10,0,2}\,\chi_{0,2} + \beta_{10,0,4}\,\chi_{0,4} + \beta_{10,0,6}\,\chi_{0,6} + \beta_{10,0,8}\,\chi_{0,8} + \beta_{10,0,10}\,\chi_{0,10}$$

Feature-Level Fusion

Score-Level Fusion

Decision-Level Fusion

Software 2180 Implementing Hand-Based
Biometric Analysis Techniques

HAND-BASED BIOMETRIC ANALYSIS

CROSS-REFERENCE TO RELATED APPLICATION

This application claims the benefit of U.S. Provisional Application No. 60/814,163, filed Jun. 16, 2006, the disclosure of which is hereby incorporated by reference.

GOVERNMENT SUPPORT

The invention described in this patent application was made in part by government support under NASA Grant # NCC5-583. The United States Government may have rights in this invention.

BACKGROUND

Existing techniques for biometrics-based authentication systems include methods that employ recognition of various biometric tokens including, for example, fingerprint, face, hand, and iris recognition. Various biometric choices have strengths and weaknesses depending on their systems' applications and requirements. The present discussion focuses on hand-based biometric analysis. The geometry of the hand contains relatively invariant features of an individual. In existing systems, hand-based authentication is sometimes employed in small-scale person authentication applications due to the fact that geometric features of the hand (e.g., finger length/width, area/size of the palm) are not as distinctive as fingerprint or iris features.

However, existing techniques and systems rely on outmoded or inconvenient processes in order to increase identification accuracy. Among these include strict requirements about hand orientation. Existing systems go as far as to require the use physical pegs or guides to direct hand orientation during image capture in order to allow assumptions to be made during analysis which simplify computational requirements. Such requirements are undesirable from a user's perspective, however, because they make use of such a system cumbersome and potentially uncomfortable. Additionally, adding physical restrictions to a system increases the likelihood that the system will require special, costly equipment.

Another strict requirement in existing techniques is the method by which they perform recognition of an image of a hand. Many existing systems and techniques focus on extraction of several landmark points on the surface or silhouette of the hand in order to identify the shape. This point extraction is not performed easily and is frequently prone to localization errors. Such errors can, by altering the very shape and borders of the segments created, substantially increase the difficulty of performing verification or identification. Additionally, existing systems and techniques require the recognition of lines or prints on the hand or fingers in order to perform analysis. Such identification is more prone to error, both from acquisition mistakes and from inconsistencies in hand appearance from day to day.

What is needed is a system that can perform biometric analysis for identification and/or verification which does not require restrictions on hand placement to the extensive degree used in existing systems. Additionally, what is needed are techniques for performing such biometric analysis that are robust with regard to changes in placement and changes in points and lines on the hand itself.

SUMMARY

Techniques and systems for performing hand-based biometric analysis are described. In various implementations the techniques and systems will comprise one or more of the following features, either separately or in combination.

The applicants have invented systems and methods for performing hand-based biometric analysis. The systems and methods have a variety of different aspects and these aspects are exhibited in various implementations. In one aspect this biometric analysis is performed for identification of a person based on analysis of the person's hand. In another aspect this biometric analysis is performed for verification of a person's identity based on analysis of the person's hand.

In some embodiments, an orientation-independent analysis of an image of a hand is described. In another aspect, this orientation-independent analysis includes computation of Zernike moments.

Certain embodiments acquire an image of a hand without need to extract landmark points, use pegs or require other orientation restrictions. In one aspect, the use of Zernike moments for analysis provides for rotation-invariant analysis, lessening the need for restrictions on hand placement and orientation.

In some embodiments, hand images are acquired through the use of a lighting table and a camera. In one aspect, images are acquired without the use of equipment which is particular to hand verification and identification. In another aspect, images are made into silhouettes before analysis.

In some embodiments, an order value for Zernike moments is chosen to increase accuracy while allowing for efficient computation. In one aspect, this order is chosen through experimental analysis of known images.

In some embodiments, efficient computation of Zernike moments may re-use stored common terms during computation, which can reduce computation time in certain implementations. In another aspect, efficient computation of Zernike moments may employ the use of a pre-determined lookup table of computed terms used in Zernike moment calculations.

In some embodiments, the use of arbitrary-precision arithmetic for computation of Zernike moments can increase analysis accuracy. Hybrid computations may be used by, for example, combining arbitrary-precision arithmetic with arithmetic of another precision, such as double-precision. Doing so can increase computational efficiencies in some applications.

In some embodiments, segmentation of a hand image can increase computational efficiency and analysis accuracy. In some implementations, an image of a forearm can be segmented and removed from an image of a hand. In certain embodiments, an image of a hand may be segmented into separate palm and finger images. Each of the palm and finger images may be separately analyzed using Zernike moments to increase recognition accuracy. In some applications, finger segments are cleaned before analysis to avoid artifacts from segmentation.

In some embodiments, feature parameters, including Zernike descriptors, of different parts of the hand are algebraically fused into a feature vector for storage and comparison (a process also known as feature-level fusion).

In certain implementations, a metric can be chosen to be used in comparing feature vectors. In some implementations, a simple Euclidian distance may be utilized as such a metric.

In some embodiments, matching scores can be obtained by comparing corresponding feature parameters, including Zernike descriptors, of different parts of a hand to stored feature parameters for known hands. In some embodiments, these scores can be algebraically fused for comparison (a process also known as score-level fusion). In some embodiments, such a fusion can be performed through the use of a weighted summation. In some embodiments, a statistical classifier may be used to fuse the scores. In yet another aspect, a support vector machine is used to map scores into positive or negative identifiers.

In some embodiments, the outputs of several comparisons between different segments can be considered as votes in a majority-vote score generation process.

In certain applications a system for biometric analysis comprises modules for image acquisition and segmentation, for image analysis, for storing feature parameters for hand images which have previously been received by the system, and for comparing stored feature parameters to parameters gained from newly-entered hand images. In some applications feature parameters of hand images which are submitted for identification or verification can be stored if, for example, they are identified as belonging to a person who had feature parameters already stored in the system.

This Summary is provided to introduce a selection of concepts in a simplified form that are further described below in the Description. This Summary is not intended to identify key features or essential features of the claimed subject matter, nor is it intended to be used as an aid in determining the scope of the claimed subject matter.

In addition, the foregoing is a brief explanation of background and examples or features of the invention or certain embodiments of the invention. It is to be understood that all embodiments of the invention do not necessarily address all issues noted in the examples above or include all features or advantages noted in the summary and detailed description.

Additional features and advantages will be made apparent from the following detailed description of embodiments that proceeds with reference to the accompanying drawings.

BRIEF DESCRIPTION OF THE DRAWINGS

FIGS. 7(a)-(c) are examples of the segmentation process of FIG. 6.

FIGS. 12(a)-(b) are example of finger image segments before and after being smoothed.

FIG. 13 is an example of common terms in a calculation of Zernike moments.

DETAILED DESCRIPTION

The following description relates to examples of systems and methods for performing hand-based biometric analysis. While, however, much of the description herein is directed to performing image processing and analysis for images of hands, this should not be read as a limitation on the techniques and systems described herein. Similarly, although many of the descriptions herein are directed toward verification and/or identification of a person based on an acquired image of a hand, this should not be read as a requirement of all implementations of the systems and techniques described herein. Many of the processes and modules described herein may operate on other types of images, or even arbitrary images, as well as being used for purposes other than biometric analysis.

1. Examples of Hand-Based Biometric Analysis Techniques

Figure 1:
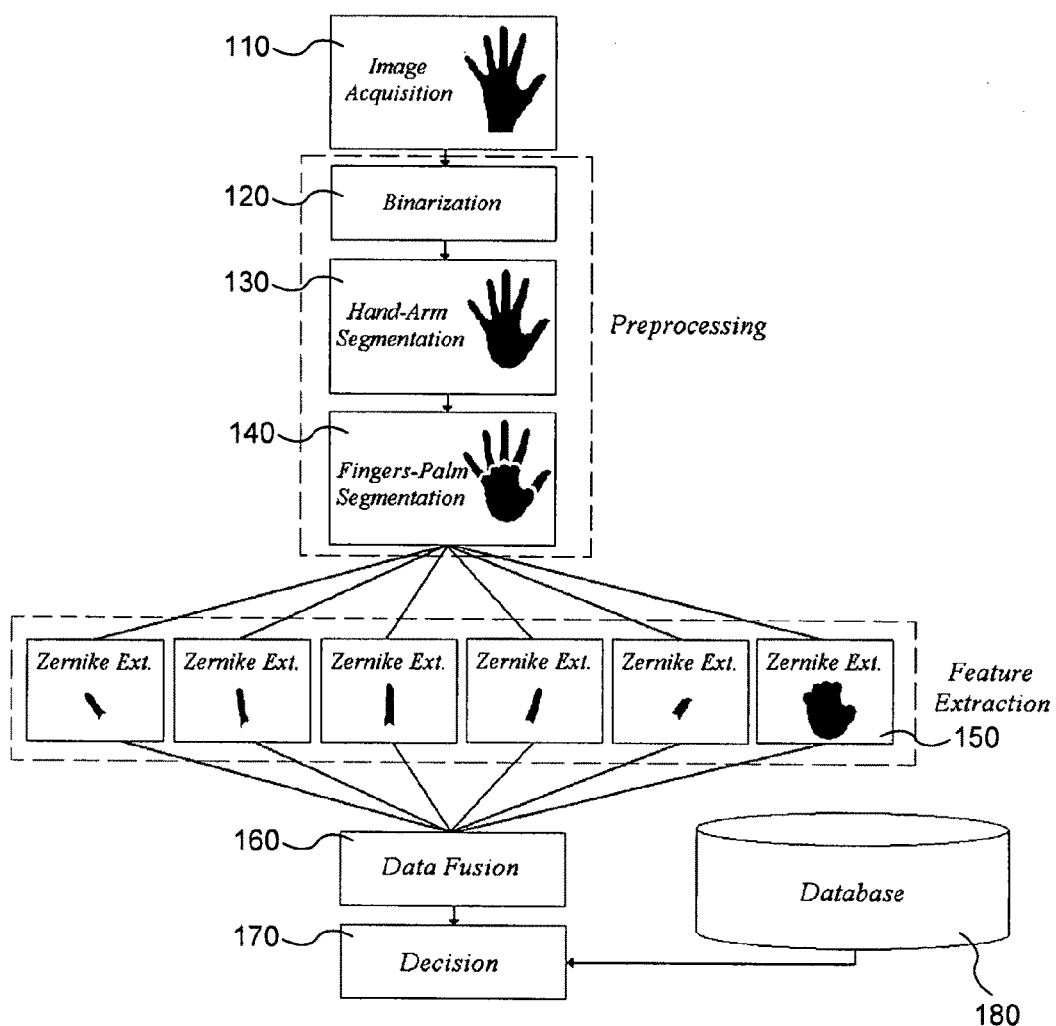
FIG. 1 is a diagram illustrating an overview of the hand-based biometric analysis techniques described herein.

The present application presents design and implementation examples for a hand-based biometric analysis system using high-order Zernike moments. In some implementations, the biometric analysis takes the form of hand-based verification or identification. FIG. 1 shows a block diagram illustrating, at a general level, the steps of one implementation of a biometric analysis systems according to the techniques described here, with specificity to hand-based verification. In the example system, at block 110 an image of a hand is acquired. Next, the image undergoes preprocessing before feature analysis is performed. Thus, at block 120, the image is binarized to produce a black and white silhouette, followed by a segmentation to separate the hand and arm segments of the image at block 130. Then, at block 140, a further segmentation occurs to segment fingers from the palm of the image. Next, at blocks 150, each of these segments undergo a feature extraction to create Zernike descriptors for each image segment. Then, at block, 160 the extracted feature data is fused according to techniques described herein, and a verification decision is made at block 170, utilizing input data from a database of feature data 180.

In various implementations, the analysis and decision-making can be performed by computing Zernike descriptors for each segmented image, and then fusing the descriptors into a feature vector which can then be compared to a database of known trusted feature vectors. Alternatively, each part of the hand can be compared separately to one or more known hand segments to obtain a matching score for that part of the hand; after comparison the matching scores can be fused together to obtain an overall matching score. In another alternative, a majority-vote process can be used for to make comparisons of different image segments for verification or identification.

As used herein, the term "verification" for an image of a hand generally refers to the determination, given a subject identifying him or herself as a particular identity and supplying an image of their hand, that the subject is believed by the system to be the particular identity. By contrast "identification" for an image of a hand generally refers to the system itself choosing a likely identity for a person given an image of their hand. Because no concrete claim of identity is made, identification frequently means comparing an image of a hand to multiple identity records. As such processes of identification are generally more complex and take more time than verification, and can be thought of as specializations of verification processes. In various implementations, the degree of belief or trust required to achieve a verification or identification may change or be modified by an administrator. Thus, the systems and techniques provided herein allow for arbitrary strengthening or weakening of the biometric analysis techniques; in various implementations modification of the relative strength of these techniques may provide for greater or fewer positive or negative identifications. Additionally, it should be noted that, while the term "biometric" is used frequently herein, the term refers only to the usage of parameters that represent a biological specimen. The term is not intended to be limited to specific measurements, such as length or width of physical hand features. Instead, the term incorporates parameters, such a Zernike moment parameters representing hand shape, which indirectly represent the shape of biological features.

In one example of improvement of existing techniques, certain of the systems and techniques described herein can operate on 2D images acquired without reference to a particular orientation. Thus, in one example, hand images are obtained by placing a hand on a planar lighting table without requiring guidance pegs, which have traditionally been used to orient a hand during image collection to increase identification accuracy. This can improve convenience for the user by allowing a greater degree of freedom in hand orientation during image capture, both saving acquisition time and allowing providing the user with a more comfortable experience. Moreover, certain of the described systems and techniques are able to perform biometric analysis without requiring direct measurement of the hand image. Thus, these systems and techniques can operate without extracting landmarks on the fingers (e.g., finding finger joints or tips or looking for lines on a palm), a process which can be prone to error.

In another example, the use of Zernike moments has been improved in certain implementations. Zernike moments have been employed in a wide range of applications in image analysis and object recognition. They can be, on the surface, quite attractive for representing hand shape information due to having minimal redundancy (i.e., orthogonal basis functions), and being relatively invariant with respect to translation, rotation, and scale, as well as robust to noise. In many existing applications, however, their use in biometric analysis has been limited to low-orders only or small low-resolution images. This is because high-order Zernike moments traditionally come with high computational requirements and can lack accuracy due to numerical errors. Unfortunately, these low-order moments are frequently insufficient to capture shape details accurately. Although there exist some techniques that rely on approximate polar coordinate transformations, it is difficult to obtain satisfactory results in the context of hand-based verification using these techniques because the approximations involved can negatively affect accuracy.

These difficulties are addressed in certain implementations of the present systems and techniques by computation of Zernike descriptors which uses a modified technique which recognizes terms which show up repeatedly during computation and which performs the evaluation of these repeated terms separately. Additionally, certain terms, which can be recomputed, are stored before analysis using a lookup table to save computations. Through these implementations, present systems and techniques can, if desired, reduce computation complexity while avoiding error introduction common to existing Zernike computation techniques. Additionally, these techniques preserve can accuracy, by avoiding any form of coordinate transformations and by using arbitrary precision arithmetic. In some implementations, certain of these techniques can provide the ability to utilize various shape descriptors to provide a more powerful representation of hand shape, replacing the conventional hand-crafted geometric features.

2. Further Examples of Hand-Based Biometric Analysis Techniques

Figure 2:
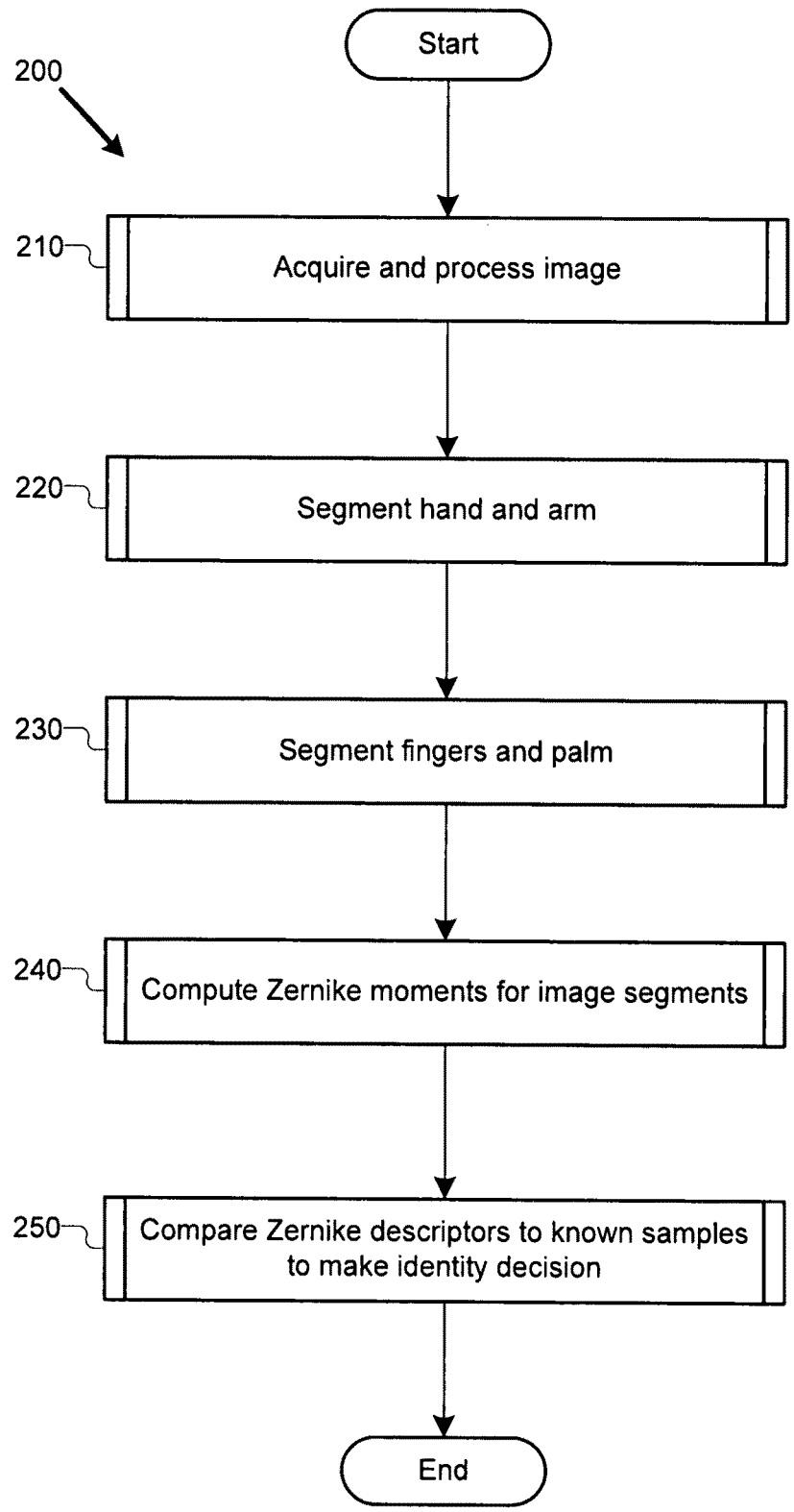
FIG. 2 is a flowchart illustrating an example process for performing hand-based biometric analysis.
Figure 3:
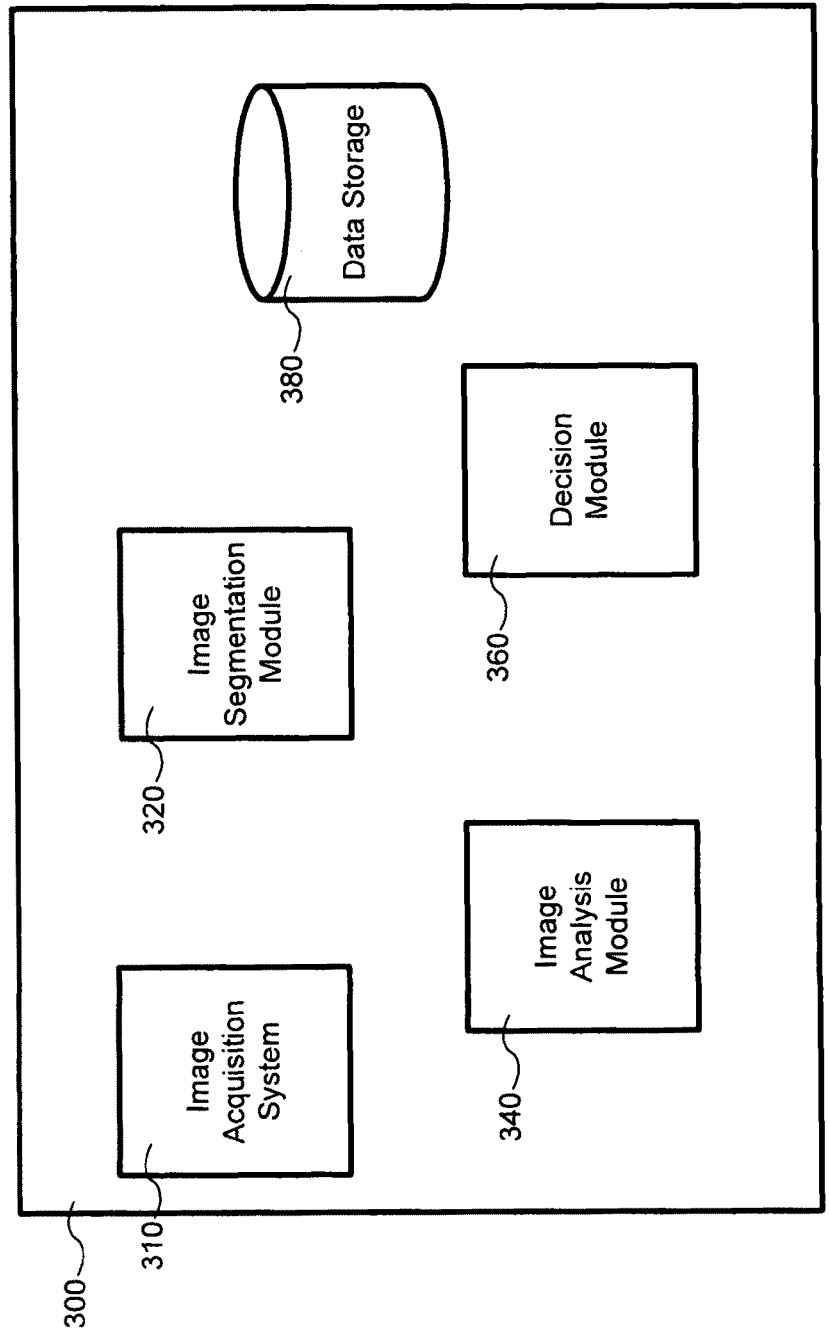
FIG. 3 is a block diagram illustrating an example system for performing hand-based biometric analysis.

FIG. 2 shows an exemplary block diagram of a procedure for performing hand-based biometric analysis according to the systems and techniques described herein. In particular, the FIG. 2 is a flowchart of an example process 200 for acquiring and analyzing an image of a hand. In various implementations, the illustrated process blocks may be merged, divided into sub-blocks, or omitted. In one implementation, the processes of FIG. 2 are performed by the Hand-Based Biometric Analysis Module 300 of FIG. 3. Various processes of FIG. 2 may be performed by software or hardware modules; examples of such modules are found as sub-modules of module 300. Additionally, various processes described herein may be shared by modules illustrated in FIG. 3 or may be performed by modules which are not illustrated. The process begins at block 210, at which an image of a hand is acquired and processed. In one implementation, this process is performed by the image acquisition system 310 of FIG. 3. Additional detail about the processes of block 210 can be found below.

The process continues to blocks 220 and 230 where the input image goes through a segmentation process. During this process, the image of the combined arm and hand are segmented to isolate the hand image at block 220, while the hand image is further segmented at block 230 into separate finger and palm segments. In one implementation the arm image is discarded after the process of block 220. In one implementation, the processes of blocks 210-230 are performed by the image segmentation module 320 of FIG. 3. Further detail about the processes of blocks 220 and 230 can be found below.

In an alternative implementation, the finger-palm segmentation procedure of block 230 is not performed. However, although Zernike moments can tolerate certain finger movement (e.g., 6 degrees rotation about the axis being perpendicular to the joint of the finger with the palm), Zernike moments become more sensitive when the fingers move close to each other. Moreover, Zernike moments generally cannot tolerate very well situations where the hand is bent at the wrist. Thus, the finger segmentation process of block 230 can aid in improving both the accuracy and the processing speed of the systems shown here.

Next, at block 240, the system performs feature extraction of the images by computing the Zernike moments of each image segment independently to obtain feature parameters. In one implementation, the processes of block 240 are performed by the image analysis module 340 of FIG. 3. Finally, at block 250, feature parameters, typically in the form of Zernike descriptors obtained by computation of Zernike moments at block 240 are compared to known hand image data to determine if the currently-analyzed hand image is similar to previously-analyzed images. Further detail about the processes of blocks 240 and 250 can be found below. In one implementation, the processes of block 250 are performed by the decision module 360 of FIG. 3 and utilize stored feature parameters kept in the data storage 380. In various implementations, the data storage may also contain additional biometric or identity data, such that identify records can be kept, and/or may contain repeated terms used in Zernike moment computation, as will be explained in detail below. In various implementations the data storage 380 comprises more-structured storage implementations, such as a database (as in the earlier example) or alternatively may comprise less-structured storage implementations, such as a drive or a disk array.

3. Examples of Image Acquisition

Figure 4:
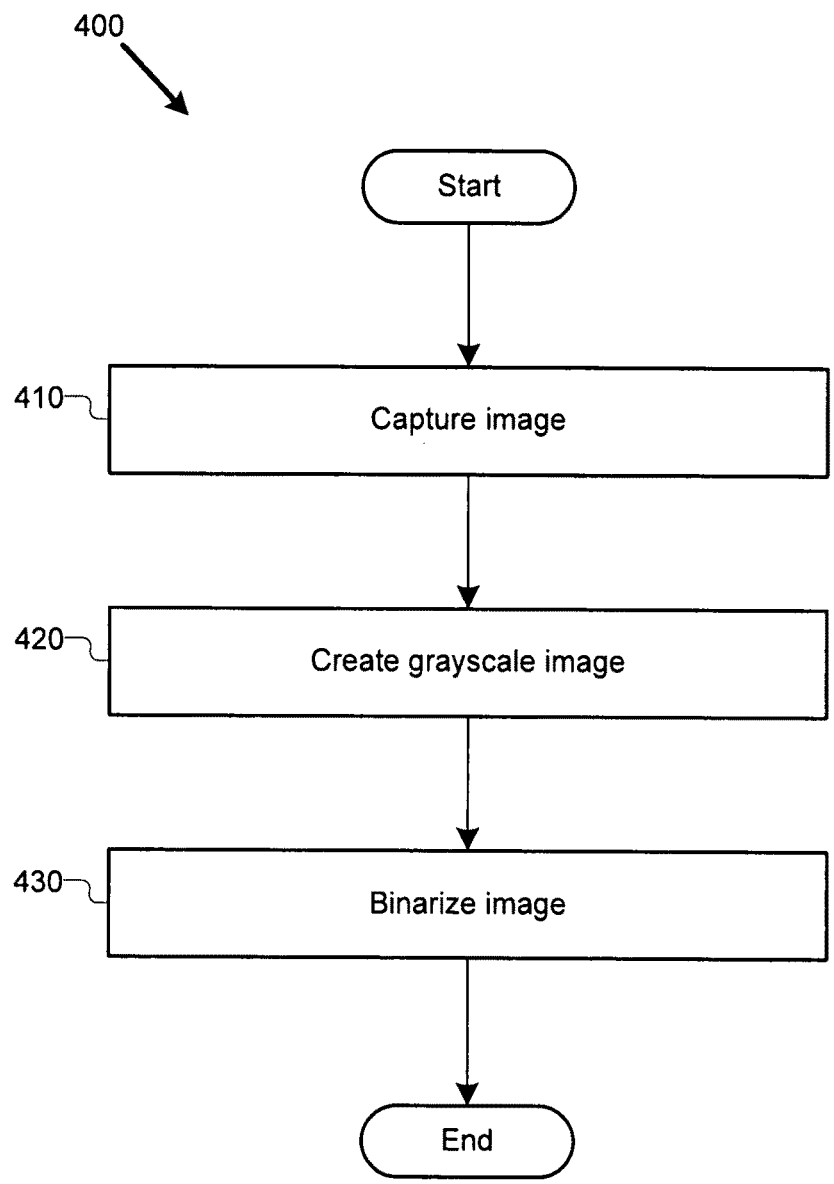
FIG. 4 is a flowchart illustrating an example process for acquiring and processing an image in the hand-based biometric analysis techniques described herein.
Figure 5:
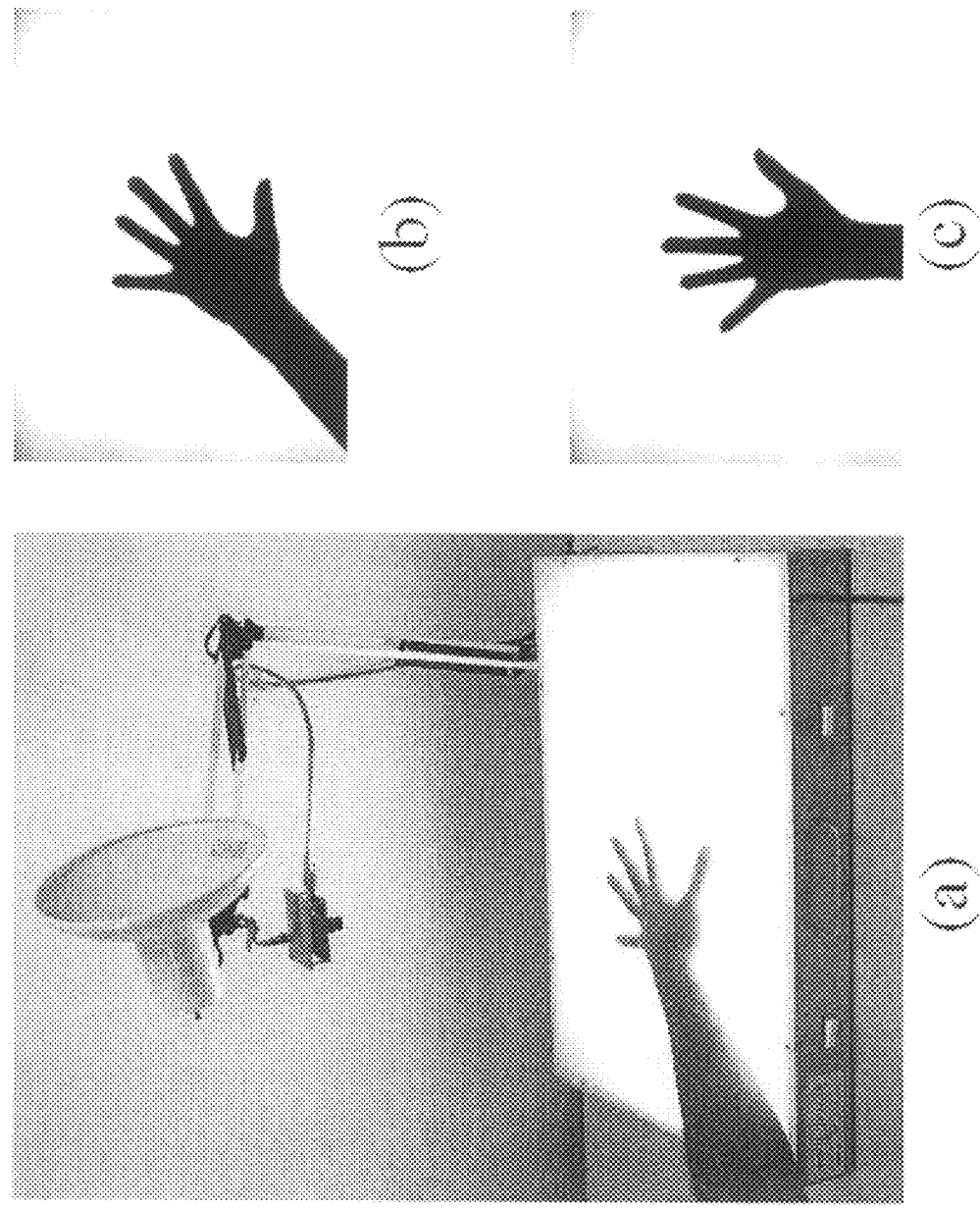
FIGS. 5(a)-(c) are pictorial examples of image acquisition for the hand-based biometric analysis techniques described herein.

FIG. 4 shows an exemplary block diagram of a procedure for performing hand-based biometric analysis according to the systems and techniques described herein, and in particular, the processes performed by the image acquisition system 310 when performing the processes of block 210. In various implementations, the illustrated process blocks may be merged, divided into sub-blocks, or omitted. The process begins at block 410, where the image of a hand is captured. One example of an image acquisition system according to the techniques described herein consists of a VGA resolution CCD camera and a planar lighting table, which provides the surface on which a hand may be placed. An example of such a system can be found in FIG. 5*a*, in which the direction of the camera is perpendicular to the lighting table. In the example, the camera has been calibrated to remove lens distortion. In the illustrated implementation, the image obtained by the camera is of the back of the hand being analyzed. In some applications, biometric analysis can be performed on such an image without the need to acquire an image of the front of the hand, or of any particular lines or features of the palm or fingers. However, in alternative implementations, the biometric analysis may be augmented through additional image (or other biometric) analysis techniques, such as the analysis of finger or hand prints.

In alternative implementations both the camera and the lighting table can be placed inside a box to more effectively eliminate light interferences from a surrounding environment. However, the depicted implementation, especially when utilized alongside the biometric analysis techniques described herein, provides images of high-enough quality without much effort to control the environment that they can be used in biometric analysis. When the user places his/her hand on the surface of the lighting table, an almost binary, shadow, and noise free silhouette of the hand is obtained (e.g., the examples shown in FIGS. 5*b* and 5*c*. Another alternative implementation uses a flatbed scanner tuned to capture the hand silhouette. Yet another implementation processes the image through a threshold or filter to create a silhouette with a more stark contrast to facilitate later analysis.

In one implementation, during the acquisition process users are asked to stretch their hand and place it inside a large rectangular region marked on the surface of the table. This facilitates visibility of the whole hand and avoids perspective distortions. However, while various implementations may utilize broad directions in order to facilitate analysis, In the illustrated implementation, there are no limitations on the orientation of the hand. This can provide an advantage over previous implementations, which typically require the use of pegs or other strict orientation guides.

The images can be captured using a gray scale camera; in another implementation, however a color CCD camera can be used if available. Thus, in block 420, if the image is taken in color, it is modified to create a grayscale image. One implementation of such a process uses the luminance values of pixels to obtain a grayscale image. For instance, luminance $Y_{i,j}$ of a pixel (i,j) can be given by $Y_{i,j}=0.299R_{i,j}+0.587G_{i,j}+0.114B_{i,j}$, (6) where $R_{i,j},G_{i,j},B_{i,j}$ denote the RGB values of a pixel. Next, at block 430, the grayscale image is binarized to create a binary image (e.g. an image containing only black and white pixels), in order to facilitate later analysis. The binary value $B_{i,j}$ of a pixel can be calculated as $$B_{i,j} = \begin{cases} 1 & \text{if } Y_{i,j} < T \\ 0 & \text{otherwise} \end{cases} \qquad 1$$

where T is a constant threshold. In one implementation, this threshold is determined experimentally; one exemplary value for the threshold is T=0.5. The resulting silhouette is accurate and consistent due to the design of the image acquisition system. This is useful for the use of high order Zernike moments as Zernike moments can be sensitive to small changes in silhouette shape.

4. Examples of Image Segmentation

As discussed above, after processing of an image, the image segmentation module performs the segmentation of the hand, forearm and fingers. One example segmentation process is summarized as follows. In one implementation, for separating the forearm from the hand, first the palm is detected by finding the largest circle inside the hand/arm silhouette. Then the intersection of the forearm with the circle's boundary and image boundary is found to segment the hand. In one implementation, in order to segment the fingers and the palm, the fingers are filtered out first using morphological closing; next, the palm is subtracted from the whole silhouette to segment fingers. The fingers image segments are then processed to remove artifacts of the previous segmentation which could affect analysis. Details of these processes follow.

In the examples discussed above, the binary silhouette provided by the acquisition module is the union of the hand and the forearm. The forearm, however, does not have as many distinctive features, and its silhouette at different acquisition sessions is not expected to be the same due to clothing and freedom in hand placement. Thus, the present embodiment removes the forearm segment before continuing image processing.

To segment the forearm, one implementation utilizes an assumption that a user providing a hand image is not wearing very loose clothing on the arm. Under this assumption, the palm can be identified as becomes a thicker region of the silhouette, which enables the palm's detection through the finding of the largest circle inside the silhouette.

Figure 6:
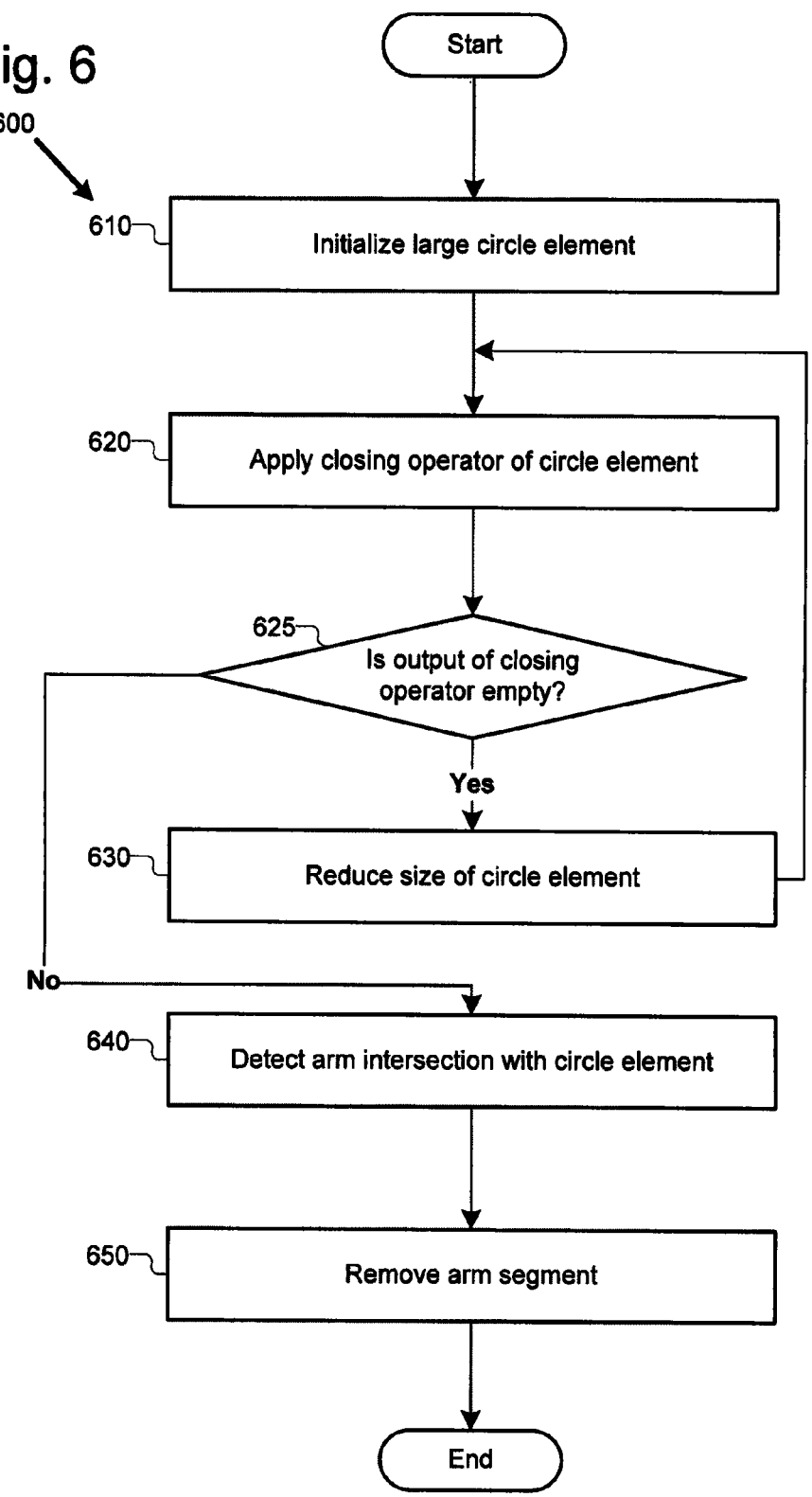
FIG. 6 is a flowchart illustrating an example process for segmenting an image of a hand and forearm according to the hand-based biometric analysis techniques described herein.
Figure 8:
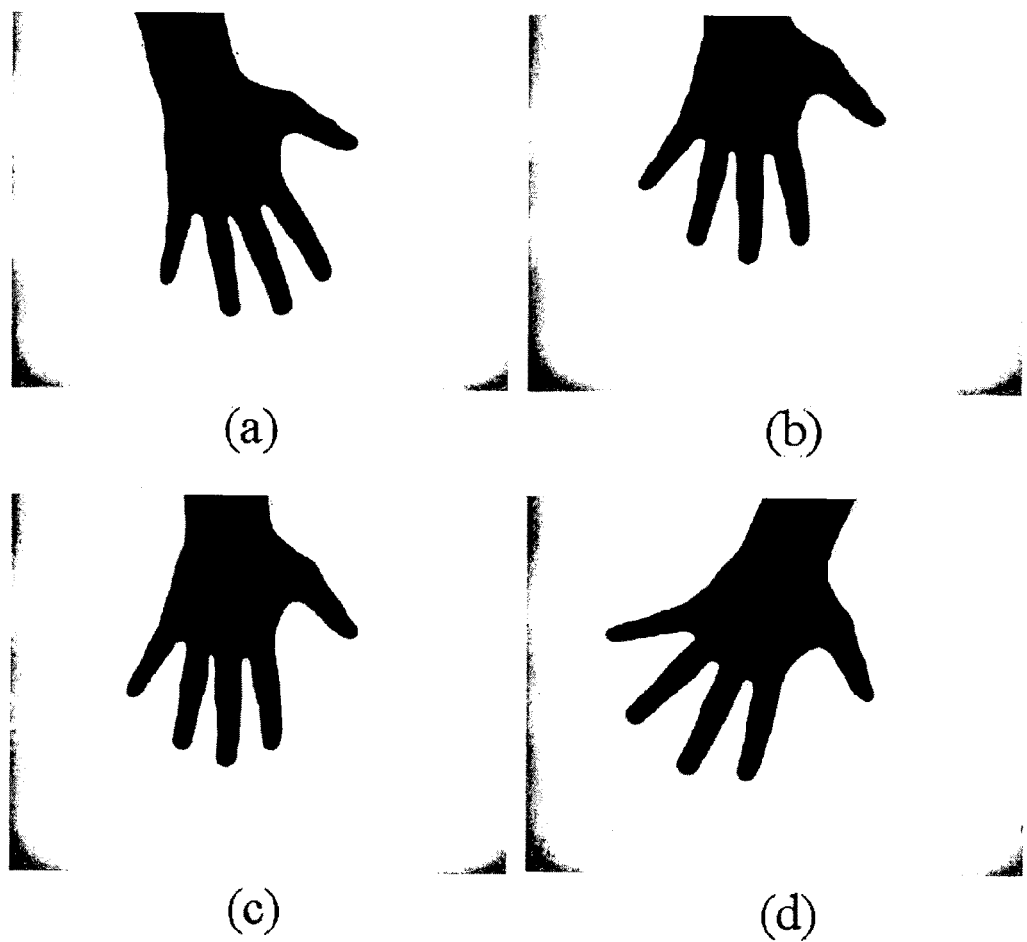
FIGS. 8(a)-(d) are examples of finger movement observed in acquired hand images.

FIG. 6 is a flowchart of an example process 600 for segmenting an acquired arm/hand image to remove the forearm segment. In various implementations, the illustrated process blocks may be merged, divided into sub-blocks, or omitted. The process begins at block 610, where the image segmentation module 320 initializes a circular structuring element D with a very large radius R. Next, at block 620, the module 320 applies a closing operator on the image using D. Then, at decision block 625, the module determines if the output is an empty image. If the output is empty, then at block 630 the size of the circle element is reduced (e.g. by setting R:=R−1) and the process returns to block 620. If the circle is not empty, then the resulting image from the closing operator should be the largest circle inside the silhouette. One example of an output of this procedure on a sample image is illustrated in FIG. 7b. Thus, at block 640, once the largest circle is found, the arm is segmented by detecting its intersection with the circle and the boundary of the image; the arm portion of the image can then be removed at block 650. FIG. 7c shows the resulting silhouette after discarding the arm region.

Segmentation of finger and palm portions can also be useful to obtain an accurate hand analysis. In one implementation, to support accurate image capture and analysis, users are instructed to stretch their hands in order to avoid touching fingers. However, finger motion is often unavoidable. An example of samples collected from the same user, shown in FIGS. 8(a)-8(d), illustrates this. As can be seen, the angles between fingers can change significantly between different samples. And while Zernike moments can tolerate finger motion to some degree, however, in order to deal with the potential for large finger motion, the present embodiment segments the fingers and palm to be processed separately. This segmentation, by providing multiple groups of feature parameters can allow for more focused optimization (such as by selecting different orders for Zernike moments for different segments), thus increasing potential accuracy.

Figure 9:
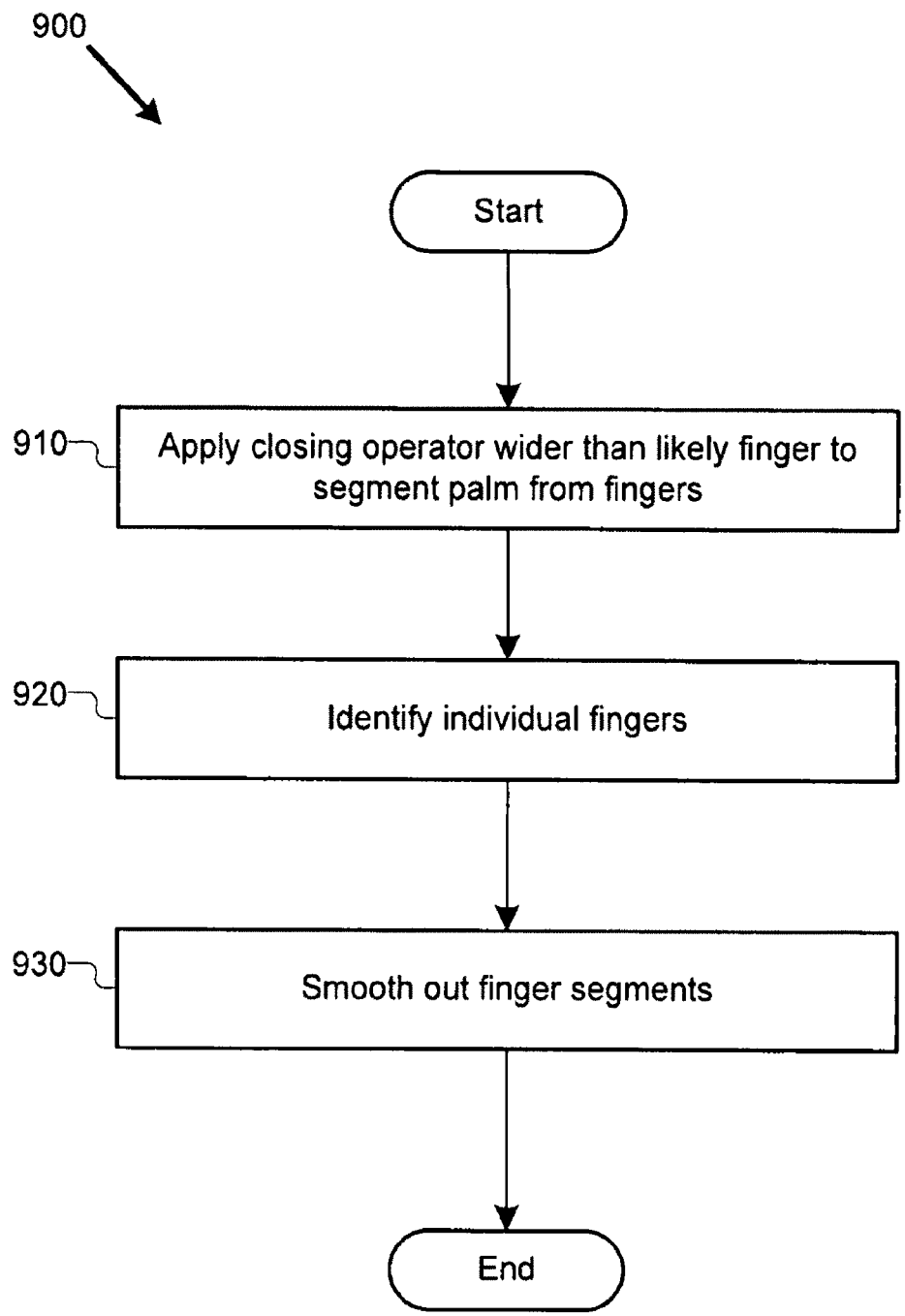
FIG. 9 is a flowchart illustrating an example process for segmenting an image of fingers and a palm according to the hand-based biometric analysis techniques described herein.
Figure 10:
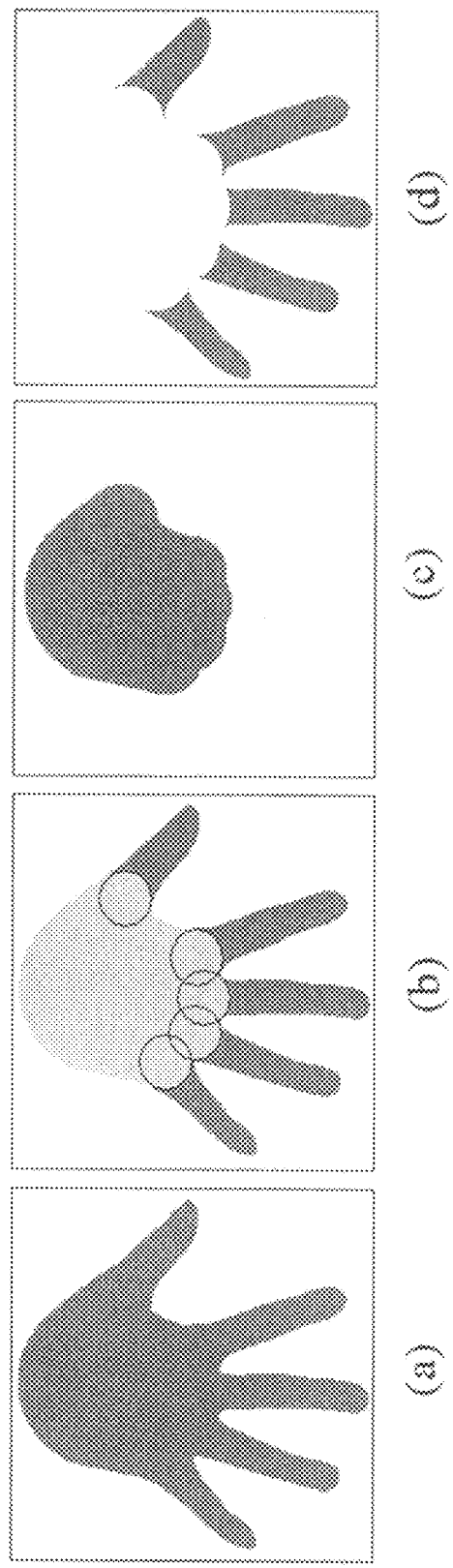
FIGS. 10(a)-(d) are examples of the segmentation process of FIG. 9.

One example of such segmentation processing is shown in FIG. 9. To perform this segmentation, first, a morphological closing operation based on a circular disk is applied on the input image, as shown in FIG. 10(a). In one implementation of the operation, the radius of the structuring element was experimentally set to 25 pixels (i.e., making it thicker than a typical widest finger found in an exemplary database of examples). This closing operation filters out the fingers from the silhouette, as shown in FIGS. 7(b) and 7(c). The remaining part of the silhouette (e.g. FIG. 7(c)) corresponds to the palm, which is then subtracted from the input image to obtain the finger segments, as shown in FIG. 7(d). In another technique, fingers are segmented from a palm by detecting landmark points on the hand, such as fingertips and valleys, such as is performed in some traditional hand-based verification techniques. However, these techniques tend to be prone to errors due to inaccuracies in landmark detection and thus are not used in the exemplary implementations. In one implementation, finger regions are individually identified using connected components analysis.

Figure 11:
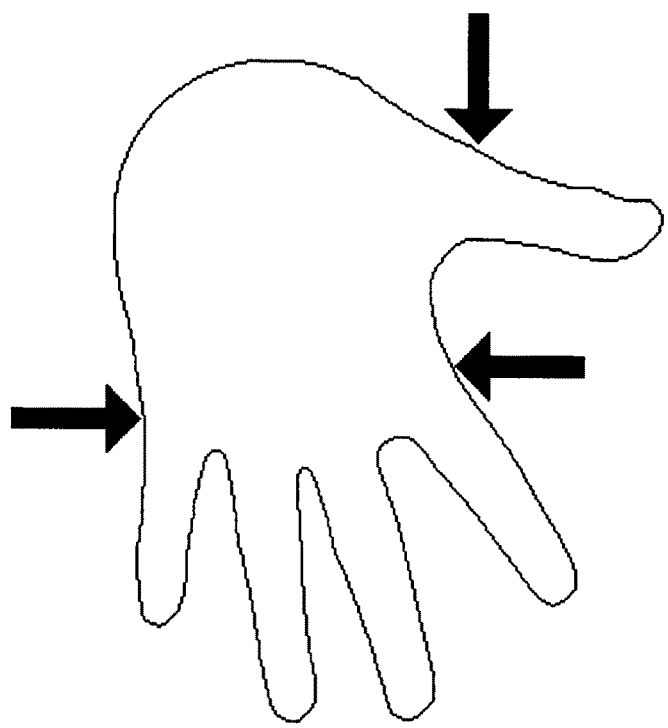
FIG. 11 is an example of points on a hand where smoothing of finger image segments is desirable.

As FIG. 10(d) illustrates, however, due to the segmentation process the segmented fingers often have sharp tails at the locations where they meet the palm. The curvature of the hand contour at these locations is less severe for the little, point, and thumb fingers, as shown in FIG. 11. As a result, because these fingers are not as easily cut off by finger segmentation, for a given segmentation there may be significant differences in the length of the tails corresponding to these fingers. Examples of these differences are shown as shown in FIG. 12(a), where different samples from the same subject are shown. In some cases, especially when the hand is small, there are significant differences in the length of the tails, which can make accurate and efficient computation of Zernike moments difficult.

To remove these tails, thus facilitating later analysis, the process of FIG. 9 continues at block 930, where finger segments are smoothed out by applying an extra morphological closing step. In one implementation, this closing step is performed with a simple 4 by 4 square with values set to one. The benefit of such processing can be observed by comparing the finger image segments of FIG. 12(a) to FIG. 12(b). The circles in the Figures illustrate circles which can enclose each finger. Thus, by applying this closing processing, the amount of tail reduction can easily be seen. Additional benefits of this smoothing step can be seen in the following Table, which illustrates the effect of this process by showing the normalized distances between the circles surrounding pairs of corresponding fingers shown in FIGS. 12(a) and 12(b):

| Pair of Fingers | $d_{before}$ | $d_{after}$ |
| --- | --- | --- |
| Little | 0.5904 | 0.0901 |
| Point | 0.7881 | 0.1135 |
| Thumb | 0.7424 | 0.1253 |

As the table shows, the application of a smoothing processing step has the potential to improve matching scores considerably by reducing the difference between successive scans of the same finger.

5. Examples of Zernike Moment Computation

In various implementations, once various segments have been identified for a hand silhouette, Zernike moments are computed for each of the various segments in order to arrive at a set of Zernike descriptors (such as in block 240 of FIG. 2). It is these descriptors that are used, either as they are created or in a fused form, as feature parameters, which can be stored for future hand-based biometric analysis or compared against previously-stored feature parameters to determine if the hand is the same as a known hand.

Generally, Zernike moments are based on a set of complex polynomials that form a complete orthogonal set over the interior of the unit circle. A Zernike moment for an image is defined as the projection of the image on these orthogonal basis functions. Specifically, the basis functions $V_{n,m}(x, y)$ are given by:

$$V_{n,m}(x,y) = V_{n,m}(\rho,\theta) = R_{n,m}(\rho)e^{jm\theta} \qquad 2$$

where n is a nonnegative integer known as the "order" of the Zernike moment resulting from these functions. Additionally, in the implementation given as equation 2, $j=\sqrt{-1}$, m is a nonzero integer subject to the constraints that n−m is even and m<n, ρ is the length of the vector from origin to (x,y), θ is the angle between the vector and the x axis in a counter clockwise direction, and $R_{n,m}(\rho)$ is what is known as a Zernike radial polynomial. $R_{n,m}(\rho)$ is defined as follows:

$$R_{n,m}(\rho) = \sum_{k=|m|, n-k=even}^{n} \frac{(-1)^{\frac{n-k}{2}} \left(\frac{n+k}{2}\right)!}{\left(\frac{n-k}{2}\right)! \left(\frac{k+m}{2}\right)! \left(\frac{k-m}{2}\right)!} \rho^k \qquad 3$$

which is denoted, for the sake of simplicity of terminology, as:

$$R_{n,m}(\rho) = \sum_{k=|m|, n-k=\text{even}}^{n} \beta_{n,m,k} \rho^k \quad 4$$

From this definition, it follows that $R_{n,m}(\rho)=R_{n,m}(\rho)$, and from the orthogonality of the basis functions $V_{n,m}(x,y)$, the following holds:

$$\frac{n+1}{\pi} \int\int_{x^2+y^2 \leq 1} V_{n,m}(x,y) V_{p,q}^*(x,y) = \delta_{n,p} \delta_{m,q} \quad 5$$

where $$\delta_{a,b} = \begin{cases} 1 & \text{if } a = b \\ 0 & \text{otherwise} \end{cases} \quad 6$$

It is this orthogonality that, in part, allows the Zernike functions to provide a useful basis for an image function.

For a digital image defined by a digital image function $f(x, y)$, then, the Zernike moment of order n with repetition is given by:

$$Z_{n,m} = \frac{n+1}{\pi} \sum\sum_{x^2+y^2 \leq 1} f(x,y) V_{n,m}^*(x,y) \quad 7$$

where $V_{n,m}^*(x, y)$ is the complex conjugate of $V_{n,m}(x, y)$. In some of the examples described herein, the digital image function $f(x, y)$ need only describe, for each $(x, y)$ pair, whether the pixel at that point in the binary image is on or off. In alternative implementations, more complex digital image functions may be used.

To compute the Zernike moments of a given image, in one implementation the center of mass of the object is taken to be the origin. As Equation 7 shows, because the radial polynomial is symmetric, the magnitude of the Zernike moments are rotation invariant. By taking the center of mass to be the origin before computing a Zernike moment, the moments are, barring subtle changes in images, essentially translation-invariant as well. Thus, for substantially-similar images, their Zernike moments will be substantially similar, even if one is rotated or moved around. Similarly, in some implementations the systems and techniques scaled images inside a unit circle to provide scale invariance.

In some implementations, once Zernike moments have been determined for an image (such as that of a hand), the image can be reconstructed. This reconstruction is not necessary for every implementation of creating and comparing a database of hand-based verification data, however. This can be done using the following truncated expansion:

$$f(x,y) = \sum_{n=0}^{N} \frac{C_{n,0}}{2} R_{n,0}(\rho) + \sum_{n=1}^{N} \sum_{m>0} (C_{n,m}\cos(m\theta) + S_{n,m}\sin(m\theta)) R_{n,m}(\rho) \quad 8$$

where N is the maximum order of Zernike moments being used, and $C_{n,m}$ and $S_{n,m}$ denote, respectively, the real and complex parts of the Zernike moment terms $Z_{n,m}$. This reconstruction may be used, for example, to illustrate a hand image chosen from a database of images upon analysis; this could provide additional feedback to a user or operator of a biometric analysis apparatus.

As mentioned above, one method used in existing systems to improve the speed of Zernike moments computation involves using a quantized polar coordinate system. In one such technique, a square to a circle transformation was employed for this purpose. In another, for an M×M image, angles were quantized to 4M levels and radii were quantized to M levels. Quantization techniques such as these suffer from a side effect, however, as errors are introduced in the computation of high order Zernike moments.

The described procedures that follow employ improved techniques that avoid using quantization, providing computation of the moments with comparable accuracy to traditional approaches (e.g., no approximations). To save computation time, these techniques find terms which occur repeatedly in various orders. Once these terms are computed, they are stored to avoid re-computing the terms later, and are available to be linearly combined with other pre-computed terms. These other terms are stored in a lookup table (such as in the data storage 380) and do not depend on any underlying image for which Zernike moments are being computed. Additionally, in one implementation, arbitrary precision arithmetic is used to increase accuracy.

The terms that can be isolated for repeat usage can be found through substitution of Equations 4 and 2 into Equation 7, which results in the following equation:

$$Z_{n,m} = \frac{n+1}{\pi} \sum\sum_{x^2+y^2 \leq 1} \left( \sum_{k=|m|}^{n} \beta_{n,m,k} \rho^k \right) e^{-jm\theta} f(x,y) \quad 9$$

$$= \frac{n+1}{\pi} \sum_{k=|m|}^{n} \beta_{n,m,k} \left( \sum\sum_{x^2+y^2 \leq 1} e^{-jm\theta} \rho^k f(x,y) \right)$$

It is this final summation (shown in parenthesis at the end) that can be isolated to determine repeating terms. For the sake of simplicity of terminology then, Equation 9 can be rewritten to clarify the repeating term:

$$Z_{n,m} = \frac{n+1}{\pi} \sum_{k=|m|}^{n} \beta_{n,m,k} \chi_{m,k} \quad 10$$

Because these $\chi_{m,k}$ terms do not rely on order number for their computation, once an image function is defined, the $\chi_{m,k}$ terms defined in Equation 10 can be re-used as common terms in future computation of moments. In some implementations, it would be possible, while computing Zernike moments up to order N, for a process to compute $\chi_{m,k}$ for each repetition. However, as FIG. 7 shows, computing $\chi_{m,k}$ once and recording these for future use is enough for computing Zernike moments of any order and any repetition by simply taking linear combinations as shown in Equation 10. FIG. 13 illustrates one example of common terms for Zernike moments up to order 10 for repetition m=0. Moreover, the coefficients $\beta_{n,m,k}$ (detailed in Equations 3 and 4) do not depend on an image function or coordinates; therefore, they can be stored ahead of time in a small lookup table to save computation.

Figure 14:
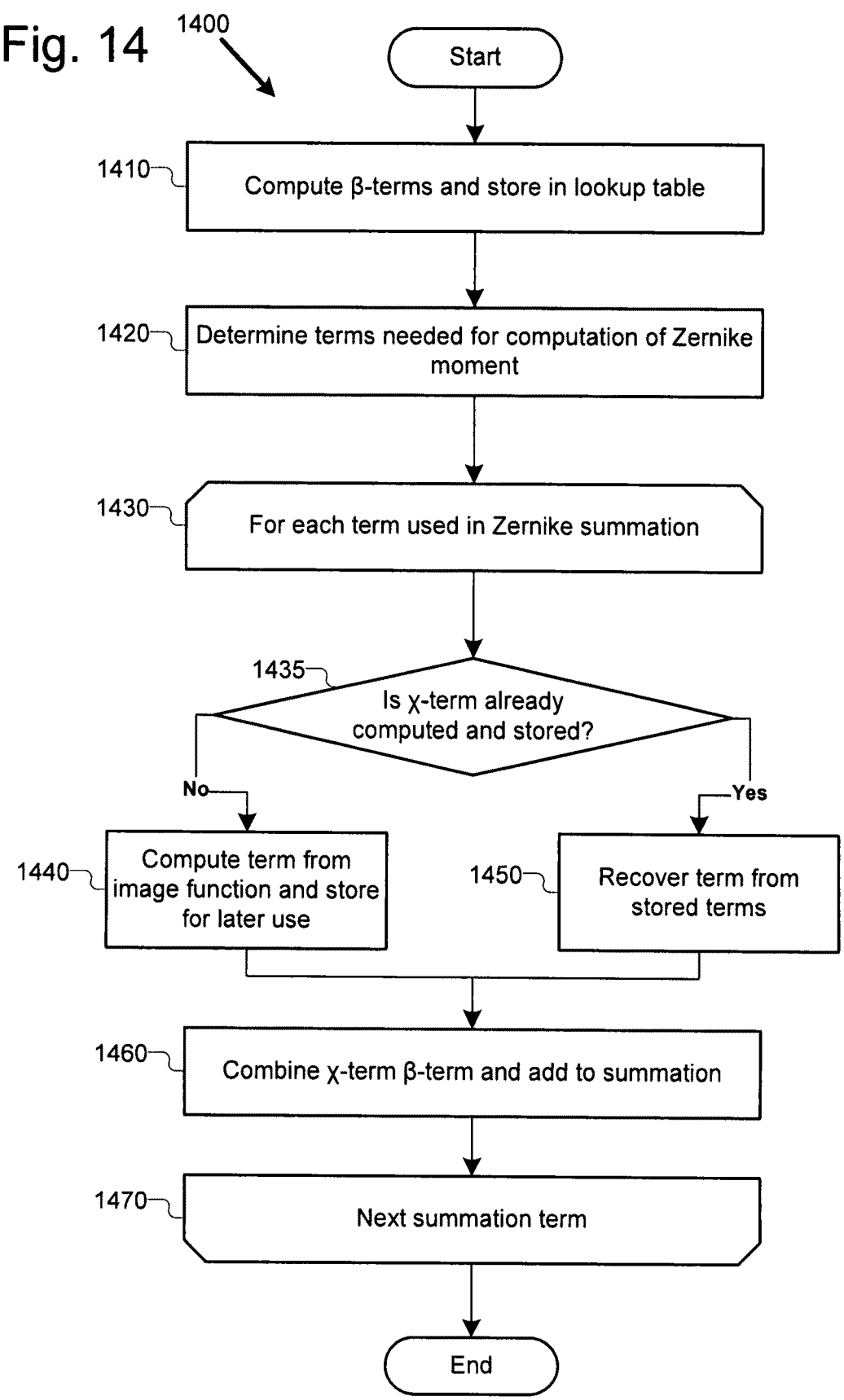
FIG. 14 is a flowchart illustrating an example process for calculating Zernike moments according to the hand-based biometric analysis techniques described herein.

FIG. 14 is a flowchart of an example process 1400 performed by the Image Analysis Module 340 for computing Zernike moments for an image using stored and re-used terms. In various implementations, the illustrated process blocks may be merged, divided into sub-blocks, or omitted. The process begins at block 1410, where the $\beta_{n,m,k}$ terms, as defined above, are computed and stored in a lookup table for later use. In various implementations, this process may be performed before any image acquisition is performed, as the $\beta_{n,m,k}$ terms do not rely on an image; alternatively the computation may be performed during image acquisition or analysis. Next, at block 1420, the various terms which are needed for computation of the Zernike moment for the image being analyzed are determined. As discussed above, this will change to some degree based on the chosen order of the Zernike moments and the repetition. The process then continues to a loop at block 1430, where a sub-process is performed for each term in the linear combination of Equation 10 used to compute a Zernike moment for the image. Thus, at decision block 1435, the module 340 determines if the necessary $\chi_{m,k}$ term in question at this point in the loop has been computed already. If not, at block 1440 the module computes the term using the image function and stores the term for later use. If, instead the $\chi_{m,k}$ term has been computed, then at block 1450 the term is recovered from storage. Next, at block 1460 the $\chi_{m,k}$ and $\beta_{n,m,k}$ are combined in the linear combination of equation 10, and the loop continues at block 1470.

Some implementations of the systems and methods described herein also may take advantage of adjustments in numerical precision in calculating Zernike moments to increase accuracy and/or efficiency. Depending on image size and maximum order chosen, double precision arithmetic may not provide enough precision; serious numerical errors can be introduced in the computation of moments under these conditions. The use of arbitrary precision arithmetic can overcome some of these limitations of double precision arithmetic and avoid undesired errors.

Figure 15:
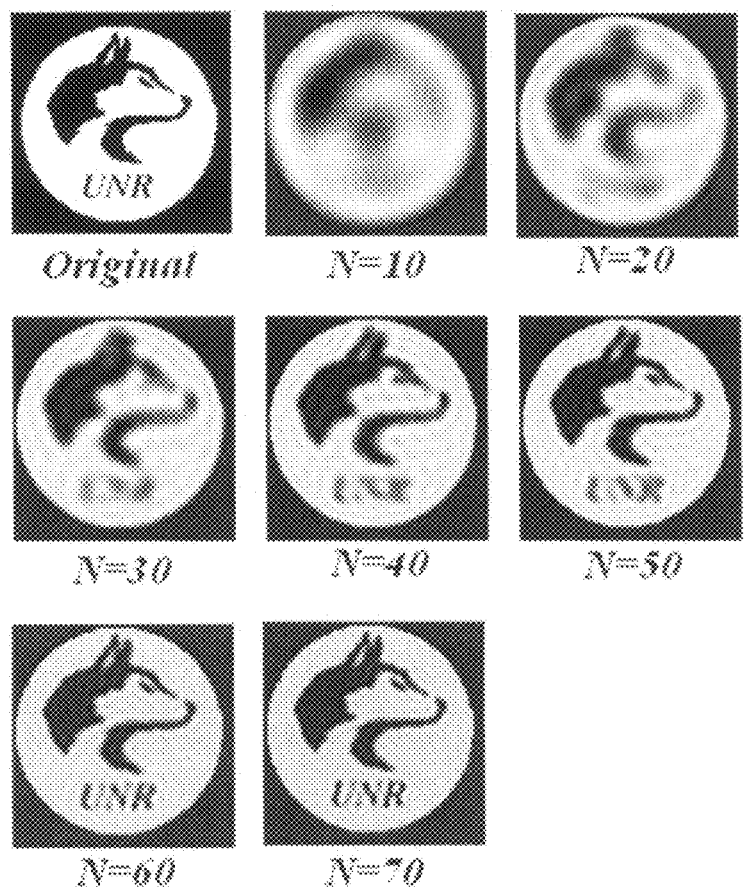
FIG. 15 is an example of reconstruction of an image using Zernike moments of different orders.

Consideration of the order of the Zernike moments affects both reconstruction accuracy as well as computational efficiency. This effect is demonstrated in FIG. 15, where the 300×300 binary input image at the top-left corner is reconstructed using different orders of Zernike moments. Traditionally, capturing the details of the input image usually utilizes high orders. Using high orders is often not practical, however, due to information redundancy and computational complexity issues. Additionally, there is an inherent limitation in the precision of arbitrary high-order Zernike moments due to the circular geometry of their domain. Thus, in some implementations, the minimum order that still provides high verification accuracy is determined.

Figure 16A:
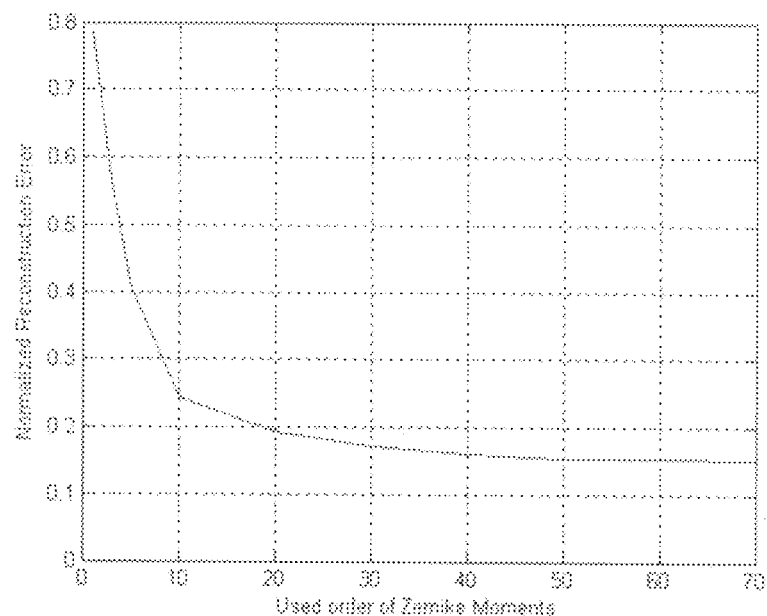
FIG. 16(a) is a graph of example errors for reconstructing finger images using Zernike moments of different orders.
Figure 16B:
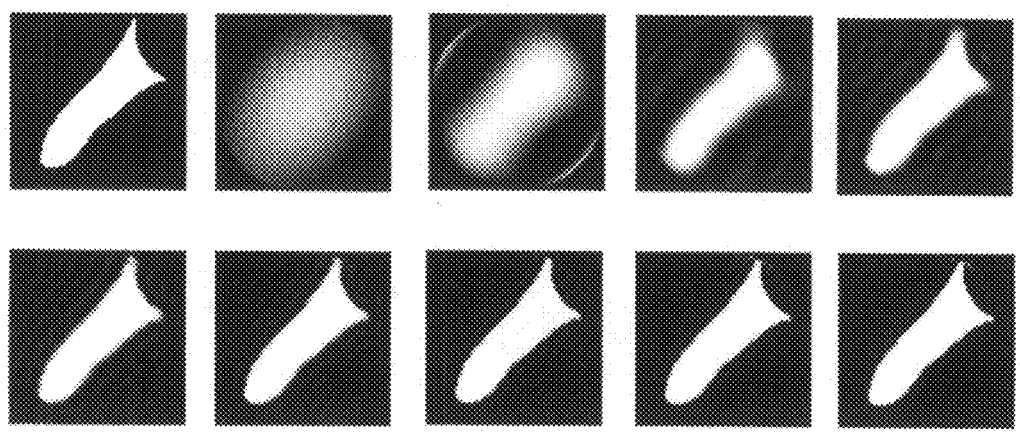
FIG. 16(b) is an example of reconstruction of a finger image using Zernike moments of different orders.
Figure 17A:
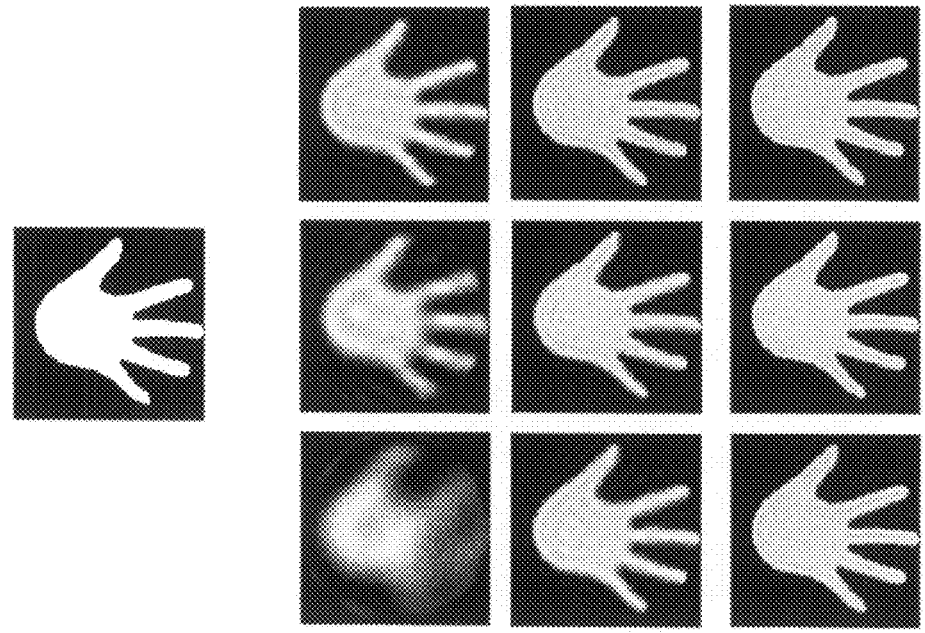
FIG. 17(a) is a graph of example errors for reconstructing entire hand images using Zernike moments of different orders.
Figure 17B:
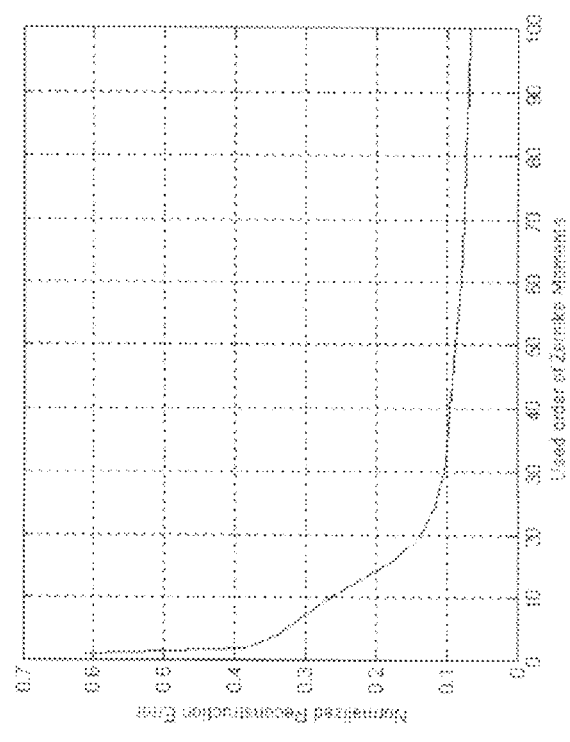
FIG. 17(b) is an example of reconstruction of an entire hand image using Zernike moments of different orders.

To determine this minimum order, one implementation uses the average reconstruction error on a large number of hand images to decide the maximum moment order that would be useful in the context of the biometric analysis described herein. FIG. 16(*a*) shows the reconstruction error of fingers for different orders. As it can be observed, the error almost saturates for orders higher than 40. In FIG. 16(*b*), the reconstructions of a finger for different orders are shown. In FIG. 16(*b*), the first image is the original image, while, from left to right, top to bottom, reconstructed images of original image are shown up to order 2, 5, 10, 20, 30, 40, 50, 60 and 70, respectively. The saturation observed in FIG. 16(*a*) is visually evident in FIG. 16(*b*). By contrast, FIGS. 17(*a*) and 17(*b*) show a similar reconstruction error graph and reconstructed images for an image of an entire hand. The reconstructed images of FIG. 17(*b*) are for the same orders as in the images of FIG. 16(*b*). As FIGS. 17(*a*) and 17(*b*) show, a higher order is necessary for good precision when attempting to precisely analyze an entire hand.

The cost of higher-order Zernike moment computation is very high, especially when precision is a requirement. Using one implementation for computing high order Zernike moments, it takes typically six minutes to compute Zernike moments up to order 70, while it takes only 35 seconds to compute moments up to order 30. One reason for low execution speed is the use of arbitrary precision arithmetic. However, experimentation has found that moments of up to order 30 can be computed with relatively high accuracy even without the use of arbitrary-precision arithmetic. Thus, in an alternative implementation, a hybrid implementation is used, where the use of arbitrary precision arithmetic is restricted to high orders only, increasing system speed. In one such implementation, it was experimentally found that using double precision instead of arbitrary precision arithmetic to compute moments up to order 36 yielded an error of less than 0.5%. Additional alternative hardware implementations using FPGAs can speed up the process as well.

This great increase in speed and reduction in complexity for lower orders supports the segmentation of the hand into finger and palm segments, as described above. As for the chosen order for the image segments, the experimentally-obtained order chosen to represent fingers in one implementation of the system is 20, while the order chosen to represent a palm is 30. In various implementations, a maximum order depends on the resolution of the image. Experimental results justify this implementation decision. To decrease the size of feature parameters, one implementation uses dimensionality reduction based on Principal Components Analysis (PCA).

6. Examples of Fusion and Identity Decision-Making

Following feature extraction, various implementations utilize some form of data fusion and comparison to determine if the hand image being analyzed matches any known hands. Various implementations may employ score-level fusion, feature-level fusion, or decision-level fusion (or some combination thereof) to make comparisons between the hand images which are being analyzed and known images. The methods differ in order and way in which they fuse and compare data. In a score-level fusion implementation, Zernike descriptors are compared segment-by-segment with known descriptors to obtain scores for each segment. These scores are then fused to arrive at an overall score for the hand image. In a feature-level fusion implementation, Zernike descriptors are fused together into a single descriptor for the hand, possibly along with dimensionality reduction or feature selection. This descriptor is then compared to previously-stored hand descriptors to obtain a matching score. In alternative implementations, other methods of comparing data obtained by computing Zernike moments may be employed.

The fusion, comparison, and decision processes described below describe the use of storage feature parameter records, in particular comparisons to them. While the processes described below are not made with reference to a particular number of records, in various implementations, the processes described herein may utilize one or more feature parameter records per person or per segment. Thus, in one implementation, a comparison between parameters for a just-acquired image may only involve comparison with a single stored set of parameters for that image. In an alternative implementation, multiple sets of enrollment templates, each a set of feature parameters, may be kept for each image or image segment. In such an implementation, comparison can take the form of comparing parameters for an acquired segment with multiple enrollment templates. In one such implementation, if a score, or distance, is being calculated between the just-acquired parameter set and the recorded sets (such as is described herein), the score can be calculated as the smallest such score found from the comparisons. Thus, if feature parameters for a thumb are compared to five thumb enrollment templates for a given identity, the score is taken as the lowest out of the five comparisons. In another implementation, a mathematical manipulation may be performed on the various scores to arrive at a combined score for that segment.

Figure 18:
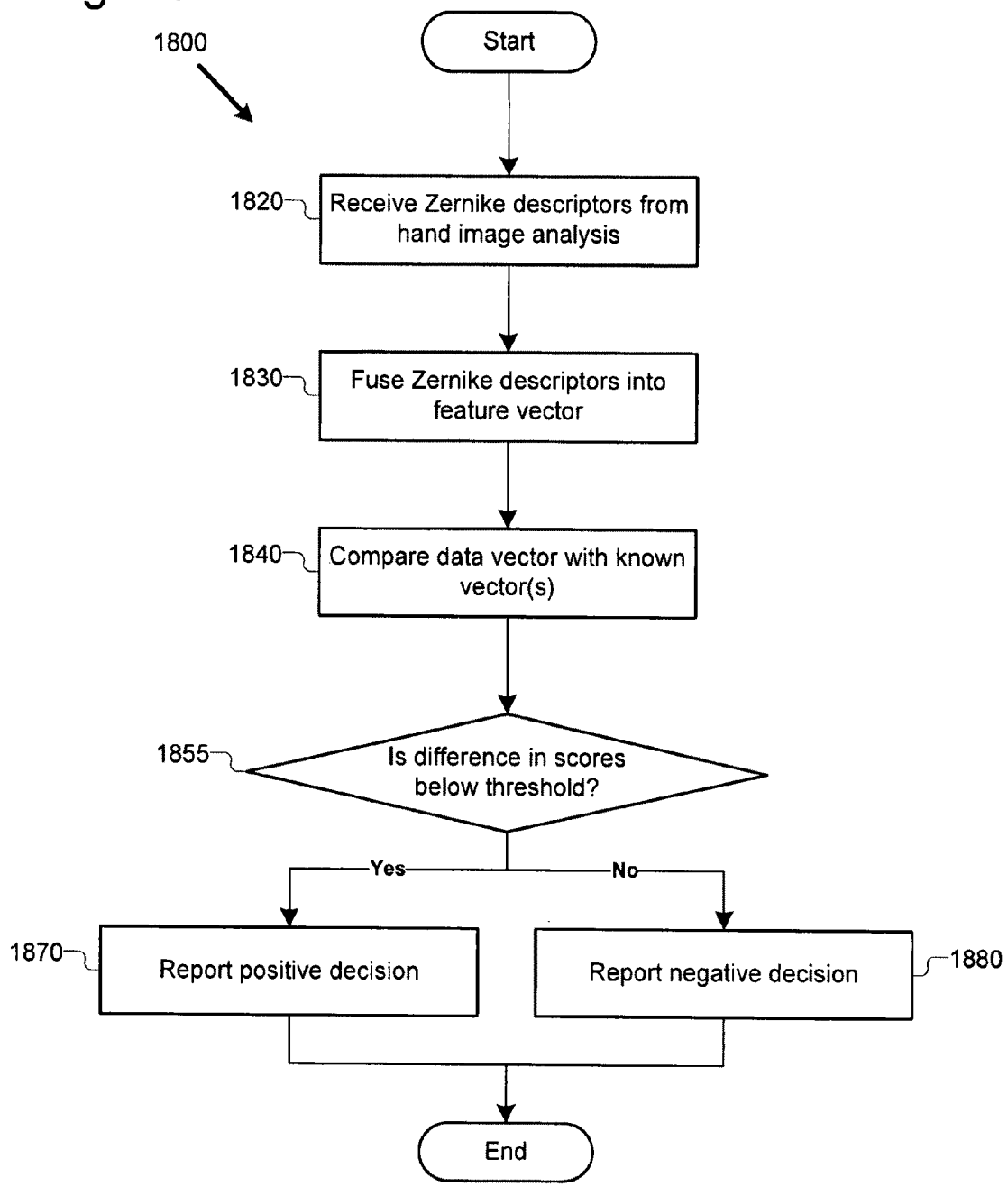
FIG. 18 is a flowchart illustrating an example process for fusing feature parameters using feature-level fusion according to the hand-based biometric analysis techniques described herein.

FIG. 18 is a flowchart of an example process 1800 performed by the decision module 360 for fusing data associated with Zernike descriptors using feature-level fusion and comparing data to known hand samples. In various implementations, the illustrated process blocks may be merged, divided into sub-blocks, or omitted. In one implementation, Principal Components Analysis is used in the implementation of the procedure. The process begins at block 1820, where the module 360 receives Zernike descriptors obtained by the hand-image analysis for comparison to known hands. Next, at block 1830, Zernike descriptors of the fingers and the palm are fused into a feature vector which represents the overall geometry of the hand. The resulting representation, in certain implementations, is invariant to various transformations, including translation, rotation and scaling transformations.

Next, at block 1840, the fused data is used to compare the present hand which is being analyzed to previously-collected data. During one implementation of the biometric analysis process, the Euclidean distance between the query and the templates provides a similarity score for verification purposes. In one implementation, multiple enrollment templates are employed per subject and the smallest distance between the query and a subject's templates indicates the similarity of the query to that subject. In various implementations, the comparison may be performed with reference to a single stored feature vector (for example if a particular identity is being verified) or multiple comparisons may be made with a plurality of stored feature vectors, in order to identify the owner of a hand.

Next, at decision block 1855, the difference, or differences, in the scores is compared to a identification threshold. The value chosen for the threshold can affect the level of security provided by the biometric analysis. Thus, a higher threshold value could result in false positive identifications (or verifications), while too low a value could result in false negatives. In one implementation, such a threshold is pre-determined experimentally or according to operational requirements, such as security level, or the identity of the person being compared. Finally, depending on the decision made at decision block 1855, the system either reports a positive decision (for verification or identification) at block 1870 or a negative decision at block 1880. The process then ends.

Figure 19:
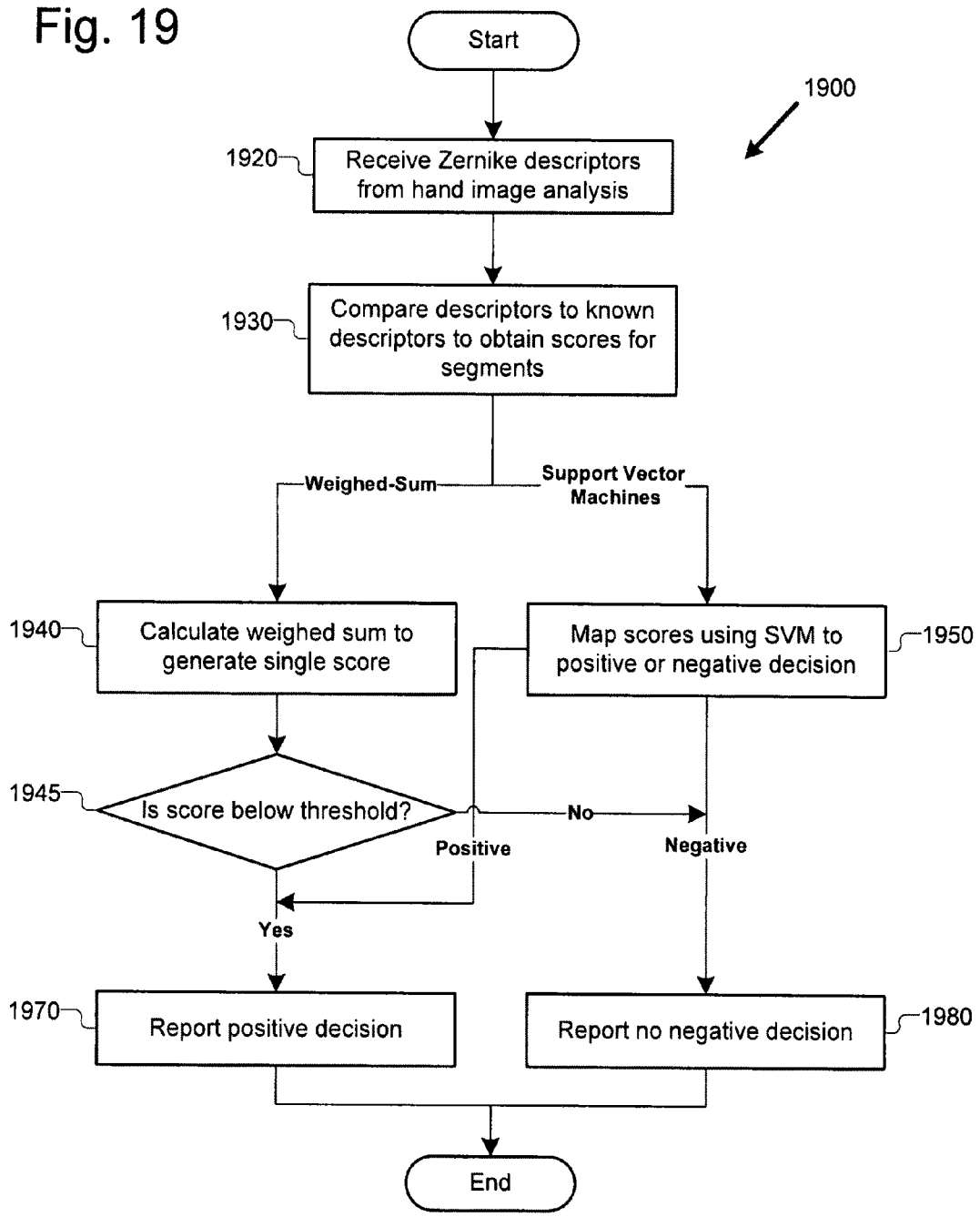
FIG. 19 is a flowchart illustrating an example process for fusing feature parameters using score-level fusion according to the hand-based biometric analysis techniques described herein.

By comparison, FIG. 19 is a flowchart of an example process 1900 performed by the decision module 360 for fusing data associated with Zernike descriptors using score-level fusion and comparing data to known hand samples. In various implementations, the illustrated process blocks may be merged, divided into sub-blocks, or omitted. The process begins at block 1920, where the module 360 receives Zernike descriptors obtained by the hand-image analysis for comparison to known hands. Next, at block 1930, the feature parameter descriptors for each segment (e.g. the palm and each finger) are compared individually to stored descriptors. Similarly to the implementations discussed above, this may be done with reference to a particular stored set of descriptors, or with a plurality of stored descriptors.

Next, depending on the implementation, the score-level fusion procedure may make a decision based on a weighted sum analysis or using support vector machines. If the implementation is using weighed-sum, then at block 1940, these scores are fused into an overall score using weighted summation. To verify (or identify) a user, the module compares the input image with the templates stored in the database and picks the template with the minimum distance from the input. Specifically, given the matching scores $s_i$ for i=1 ... 6, the overall score S is obtained as follows:

$$S(Q, T) = \sum_{i=1}^{6} \alpha_i S(Q_i, T_i) \quad 11$$

Where S denotes the similarity measure (e.g. Euclidean distance) between the query Q and the template T. $Q_i$ and $T_i$ represent the i-th part of the hand. In one implementation, the first five parts correspond to the little, ring, middle, point, and thumb fingers while the sixth party corresponds to the back of the palm. The parameters $\alpha_i$ are the weights associated with the i-th part of the hand. In one implementation, they satisfy the following constraint:

$$\sum_{i=1}^{6} \alpha_i = 1 \quad 12$$

In a feature-level fusion implementation, a similar weighed scheme may be used to determine the fused vectors.

Determining the proper weights to be used in the summation is of importance to obtain good accuracy. In one implementation, weights are determined experimentally through a search over an empirically determined set of weights to maximize accuracy over a small database of 80 samples from 40 subjects. Feature vectors are fully invariant to translations and rotations. As a result, generally any type of distance metric can be used for computing similarities by the decision module 360. Next, at decision block 1945, the score is compared to a identification threshold, similarly to the feature-level fusion described above, to determine if it is below the threshold. Finally, depending on the decision made at decision block 1945, the system either reports a positive decision (for verification or identification) at block 1970 or a negative decision at block 1980. The process then ends.

In an alternative implementation, support vector machines are used. A support vector machine ("SVM") is a binary classifier that maps input patterns X to output labels $y \in -1,1$. In general, an SVM has the following form:

$$f(X) = \sum_{i \in \Omega} \alpha_i y_i K(X, X_i) + b \quad 13$$

where $\alpha_i$ are Lagrange multipliers, ω corresponds to the indices of the support vectors for which $\alpha_i \neq 0$, b is a bias term, X is an input vector, and $K(X, X_i)$ is a kernel function. Classification decisions are based on whether the value $f(X)$ is above or below a threshold, and thus can be adjusted for greater or lesser security similarly to the processes above by adjusting the threshold. Given a pair of hands to be verified, the input vector X is composed of the scores between corresponding parts of the hand. Assigning the input vector to the class "1" implies that both hands come from the same subject while assigning it to the class "−1" implies that they come from different subjects.

Thus, in implementations utilizing a support vector machine, at block 1950 the previously-obtained scores are mapped to either a positive or negative decision according to the output of the SVM. At this point, either a positive or negative decision is then reported in either block 1970 or 1980 depending on the result.

Figure 20:
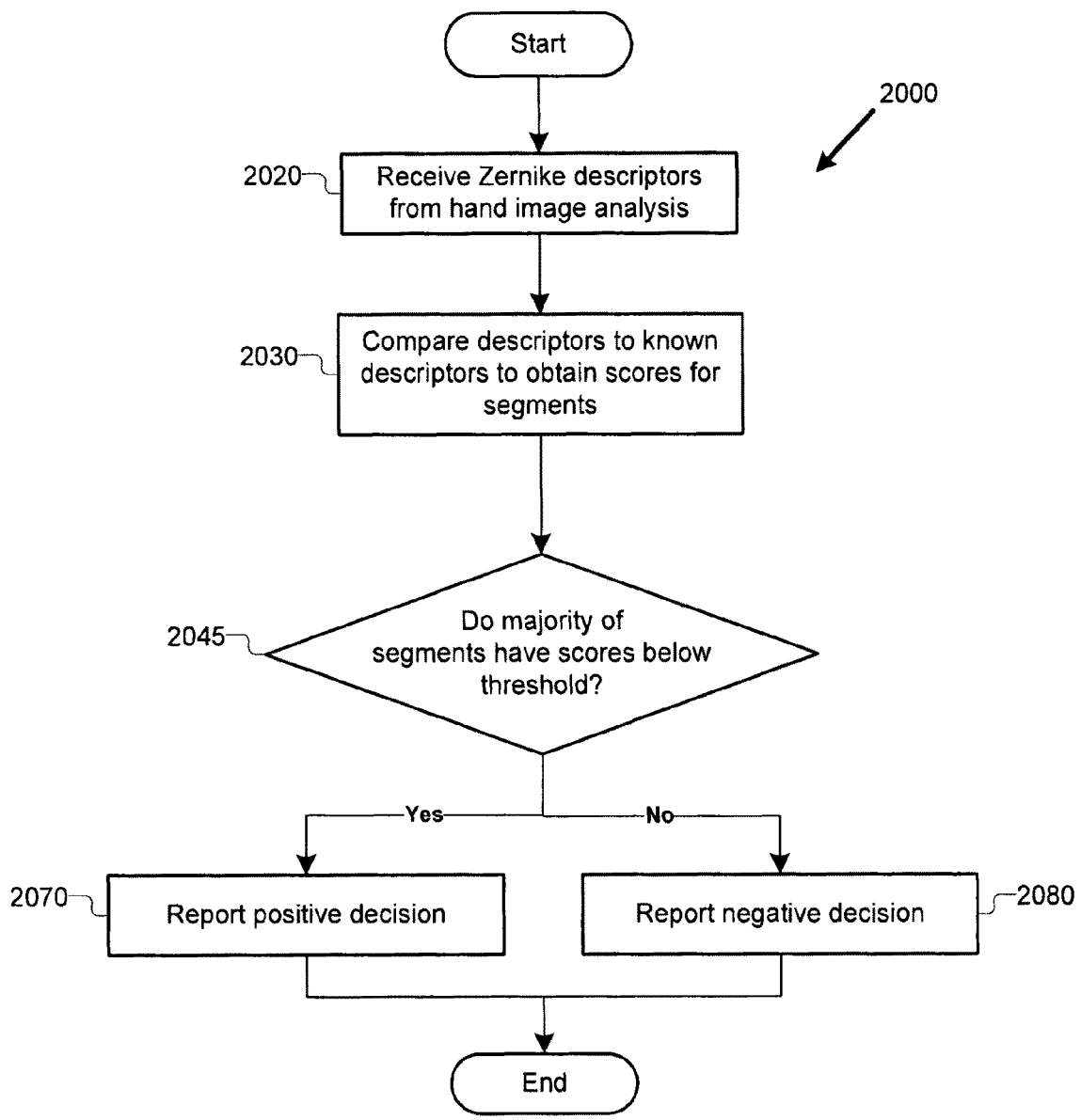
FIG. 20 is a flowchart illustrating an example process for fusing feature parameters using decision-level fusion according to the hand-based biometric analysis techniques described herein.

FIG. 20 is a flowchart of an example process 2000 performed by the decision module 360 for fusing data associated with Zernike descriptors using a decision-level fusion process and comparing data to known hand samples. The illustrated implementation depicts a process for "majority voting." Majority voting is among the most straightforward decision-level fusion strategies. In various implementations, the illustrated process blocks may be merged, divided into sub-blocks, or omitted. The process begins at block 2020, where the module 360 receives Zernike descriptors obtained by the hand-image analysis for comparison to known hands. Next, at block 2030, the feature parameter descriptors for each segment (e.g. the palm and each finger) are compared individually to stored descriptors to obtain scores for each segment. Similarly to the implementations discussed above, this may be done with reference to a particular stored set of descriptors, or with a plurality of stored descriptors.

Next, at decision block 2045, the decision module 360 determines if a majority of the scores are below one or more preset thresholds. Thus, different thresholds may be set for each type of segment, although in some implementations thresholds could be repeated. Then, if a majority of the segments have scores below the threshold, at block 2070 a positive decision is reported. If not, at block 2080 a negative decision is reported. The process then ends.

7. Computing Environment

The above hand-based biometric analysis techniques and systems can be performed on any of a variety of computing devices. The techniques can be implemented in hardware circuitry, as well as in software executing within a computer or other computing environment, such as shown in FIG. 21.

Figure 21:
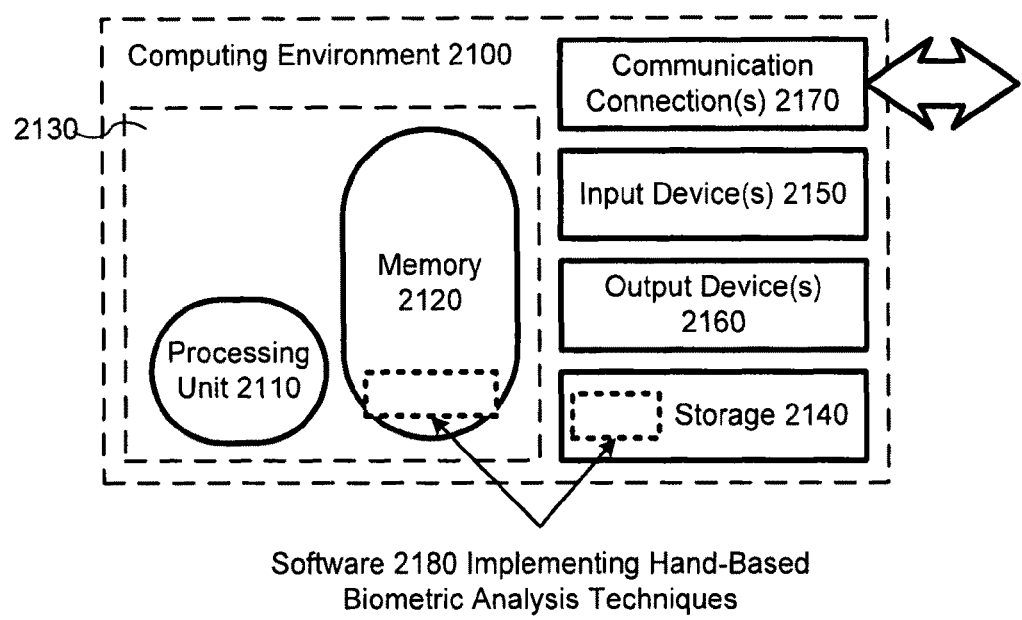
FIG. 21 is a block diagram illustrating an example computing environment for performing the biometric analysis techniques described herein.

FIG. 21 illustrates a generalized example of a suitable computing environment 2100 in which described embodiments may be implemented. The computing environment 2100 is not intended to suggest any limitation as to scope of use or functionality of the invention, as the present invention may be implemented in diverse general-purpose or special-purpose computing environments.

With reference to FIG. 21, the computing environment 2100 includes at least one processing unit 2110 and memory 2120. In FIG. 21, this most basic configuration 2130 is included within a dashed line. The processing unit 2110 executes computer-executable instructions and may be a real or a virtual processor. In a multi-processing system, multiple processing units execute computer-executable instructions to increase processing power. The memory 2120 may be volatile memory (e.g., registers, cache, RAM), non-volatile memory (e.g., ROM, EEPROM, flash memory, etc.), or some combination of the two. The memory 2120 stores software 2180 implementing the described techniques.

A computing environment may have additional features. For example, the computing environment 2100 includes storage 2140, one or more input devices 2150, one or more output devices 2160, and one or more communication connections 2170. An interconnection mechanism (not shown) such as a bus, controller, or network interconnects the components of the computing environment 2100. Typically, operating system software (not shown) provides an operating environment for other software executing in the computing environment 2100, and coordinates activities of the components of the computing environment 2100.

The storage 2140 may be removable or non-removable, and includes magnetic disks, magnetic tapes or cassettes, CD-ROMs, CD-RWs, DVDs, or any other medium which can be used to store information and which can be accessed within the computing environment 2100. The storage 2140 stores instructions for the software 2180 implementing the described techniques.

The input device(s) 2150 may be a touch input device such as a keyboard, mouse, pen, or trackball, a voice input device, a scanning device, or another device that provides input to the computing environment 2100. For audio, the input device(s) 2150 may be a sound card or similar device that accepts audio input in analog or digital form, or a CD-ROM reader that provides audio samples to the computing environment. The output device(s) 2160 may be a display, printer, speaker, CD-writer, or another device that provides output from the computing environment 2100.

The communication connection(s) 2170 enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment 2100, computer-readable media include memory 2120, storage 2140, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "calculate," and "compute," to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of determining identity using a computing system that implements a biometric analysis tool, the method comprising:

with the computing system that implements the biometric analysis tool, performing biometric analysis on an image of a hand to produce plural feature parameters without requiring a particular orientation of the hand during image capture or for the biometric analysis, wherein the biometric analysis includes:

determining a silhouette representation from the image of the hand;

segmenting the silhouette representation into plural segment images representing palm and plural fingers of the hand without using landmark points during the segmenting, the plural fingers including a thumb, wherein the palm is segmented from the thumb;

determining the plural feature parameters from the plural segment images, respectively, each of the plural feature parameters indicating geometry of a different part among the palm and the plural fingers of the hand; and making an identity decision based at least in part on the plural feature parameters and stored descriptors representing one or more previously-analyzed hand images, wherein a different weight is associated with each of the plural feature parameters, respectively.

2. The method of claim 1, wherein the plural feature parameters resulting from the biometric analysis are invariant to rotation, scale and translation.

3. The method of claim 2 wherein the image of the hand is received from an image acquisition device that lacks pegs to guide the orientation of the hand.

4. The method of claim 1 wherein the image represents a back view of the hand, such that the image lacks lines or other features of the plural fingers and the palm that characterize a front view of the hand.

5. The method of claim 1 wherein the biometric analysis is performed without reference to direct physical measurements of the image of the hand or the silhouette representation, and wherein the biometric analysis is performed without reference to landmark points within the image of the hand or the silhouette representation.

6. The method of claim 1 wherein the identity decision is a verification decision, and wherein the making the identity decision comprises:

selecting a particular descriptor among the stored descriptors; and verifying identity using the plural feature parameters and the particular descriptor.

7. The method of claim 1 wherein the identity decision is an identification decision, and wherein the making the identity decision comprises:

identifying a matching descriptor among the stored descriptors using the plural feature parameters and each of the stored descriptors, respectively, until the matching descriptor is identified.

8. The method of claim 1 wherein the determining the silhouette representation comprises, for each pixel value of plural pixel values of the image:

comparing the pixel value to a threshold;

if the pixel value satisfies the threshold, assigning the pixel value a first binary value; and otherwise, assigning the pixel value a second binary value.

9. The method of claim 1 wherein the making the identity decision uses feature-level fusion, score-level fusion and/or decision-level fusion.

10. The method of claim 1 wherein the determining the plural feature parameters from the plural segment images comprises determining Zernike moment values.

11. The method of claim 10 wherein the Zernike moment values are high-order Zernike moment values characterized by an order n, and wherein n is at least 10.

12. The method of claim 11 wherein the order of the Zernike moment values is pre-determined.

13. The method of claim 1 wherein the making the identity decision uses a threshold, the method further comprising setting the threshold depending on security level.

14. The method of claim 1 wherein the making the identity decision is further based at least in part on separate fingerprint data, other biometric data and/or other identity data.

15. The method of claim 1 further comprising adjusting the different weight associated with each of the plural feature parameters, a threshold and/or other setting of the biometric analysis tool based at least in part on the identity decision.

16. The method of claim 1 wherein the biometric analysis further includes, before the segmenting the silhouette representation into plural segment images:

segmenting the image of the hand from an input image that includes the image of the hand and an image of at least part of a forearm.

17. The method of claim 1 wherein the segmenting the silhouette representation uses morphological closing operations.

18. The method of claim 1 wherein the biometric analysis further includes, before the plural feature parameters are determined from the plural segment images:

smoothing of the plural segment images.

19. The method of claim 1 wherein the making the identity decision uses feature-level fusion and includes:

combining the plural feature parameters into feature vector, including using the different weight associated with each of the plural feature parameters as part of the combining the plural feature parameters into the feature vector; and for a given stored descriptor of the stored descriptors, comparing the feature vector with a stored vector for the given stored descriptor, wherein the identity decision is based at least in part on the comparing the feature vector with the stored vector for the given stored descriptor.

20. The method of claim 1 wherein the making the identity decision uses score-level fusion and includes, for a given stored descriptor of the stored descriptors:

for each feature parameter of the plural feature parameters:
comparing the feature parameter to a corresponding parameter for the given stored descriptor; and
calculating a score value for the feature parameter based at least in part on the different weight associated with the feature parameter and the comparing the feature parameter to the corresponding parameter for the given stored descriptor;

calculating an overall score value based at least in part on the score values for the respective feature parameters; and comparing the overall score value to a threshold, wherein the identity decision is based at least in part on the comparing the overall score value to the threshold.

21. The method of claim 1 wherein the making the identity decision uses score-level fusion and includes, for a given stored descriptor of the stored descriptors:

for each feature parameter of the plural feature parameters, comparing the feature parameter to a corresponding parameter for the given stored descriptor; and using support vector machine classification to map results of the comparing for the plural feature parameters, respectively, to the identity decision.

22. The method of claim 1 wherein the making the identity decision uses decision-level fusion and includes, for a given stored descriptor of the stored descriptors:

for each feature parameter of the plural feature parameters:

comparing the feature parameter to a corresponding parameter for the given stored descriptor to produce a feature score value; and determining whether the feature score value satisfies one or more thresholds;

wherein the identity decision is based at least in part on the determination of whether the feature score values for the plural feature parameters satisfy the one or more thresholds.

23. A method comprising:

with a computing system that implements a biometric analysis tool, performing biometric analysis on an image of a hand to produce plural Zernike moment values, wherein the biometric analysis includes:

determining a silhouette representation from the image of the hand; and using the silhouette representation to determine the plural Zernike moment values, the plural Zernike moment values indicating geometry of the hand, including:

storing plural common terms; and reusing the stored terms, thereby reducing overall computational complexity; and making an identity decision based at least in part on the plural Zernike moment values and stored descriptors representing one or more previously-analyzed hand images.

24. The method of claim 23 wherein at least some of the plural common terms are computed without reference to an image function and represent terms of a Zernike radial polynomial that depend on order of the Zernike moment values.

25. The method of claim 23 wherein at least some of the plural common terms are computed with reference to an image function and represent terms for particular projections of the image function that are independent of order of the Zernike moment values.

26. A computing system that implements a biometric analysis tool, the computing system including:

a processing unit; and memory storing computer-executable instructions for causing the computing system to perform a method comprising:

performing biometric analysis on an image of a hand to produce plural Zernike moment values, wherein the biometric analysis includes:

determining a silhouette representation from the image of the hand; and using the silhouette representation to determine the plural Zernike moment values, the plural Zernike moment values indicating geometry of the hand, including:

storing plural common terms; and reusing the stored terms, thereby reducing overall computational complexity; and making an identity decision based at least in part on the plural Zernike moment values and stored descriptors representing one or more previously-analyzed hand images.

27. The computing system of claim 26 wherein at least some of the plural common terms are computed without reference to an image function and represent terms of a Zernike radial polynomial that depend on order of the Zernike moment values.

28. The computing system of claim 26 wherein at least some of the plural common terms are computed with reference to an image function and represent terms for particular projections of the image function that are independent of order of the Zernike moment values.

29. A computing system that implements a biometric analysis tool, the computing system including:

a processing unit; and memory storing computer-executable instructions for causing the computing system to perform a method comprising:

performing biometric analysis on an image of a hand to produce plural feature parameters without requiring a particular orientation of the hand, wherein the biometric analysis includes:

determining a silhouette representation from the image of the hand;

segmenting the silhouette representation into plural segment images representing palm and plural fingers of the hand without using landmark points during the segmenting, the plural fingers including a thumb, wherein the palm is segmented from the thumb; and determining the plural feature parameters from the plural segment images, respectively, each of the plural feature parameters indicating geometry of a different part among palm and plural fingers of the hand; and making an identity decision based at least in part on the plural feature parameters and stored descriptors representing one or more previously-analyzed hand images, wherein a different weight is associated with each of the plural feature parameters, respectively.

30. The computing system of claim 29 wherein the making the identity decision uses feature-level fusion, score-level fusion and/or decision-level fusion.

31. The computing system of claim 29 wherein the biometric analysis further includes, before the segmenting the silhouette representation into plural segment images:

segmenting the image of the hand from an input image that includes the image of the hand and an image of at least part of a forearm.

32. The computing system of claim 29 wherein the segmenting the silhouette representation uses morphological closing operations.

33. The computing system of claim 29 wherein the biometric analysis further includes, before the plural feature parameters are determined from the plural segment images:

smoothing of the plural segment images.

34. A computing system that implements a biometric analysis tool, the computing system including:

a processing unit; and memory storing computer-executable instructions for causing the computing system to perform a method comprising:

performing biometric analysis on an image of a hand to produce plural feature parameters without requiring a particular orientation of the hand during image capture or for the biometric analysis, wherein the biometric analysis includes:

determining a silhouette representation from the image of the hand;

segmenting the silhouette representation, including:

filtering out plural fingers of the hand from the silhouette representation to identify a segment image for a palm of the hand, wherein the filtering out the plural fingers uses morphological closing operations;

removing the palm from the silhouette representation to identify segment images for the plural fingers, respectively; and determining the plural feature parameters from the segment image for the palm and the segment images for the plural fingers, respectively, each of the plural feature parameters indicating geometry of a different part among the palm and the plural fingers of the hand; and making an identity decision based at least in part on the plural feature parameters and stored descriptors representing one or more previously-analyzed hand images, wherein a different weight is associated with each of the plural feature parameters, respectively.

35. The computing system of claim 34 wherein the making the identity decision uses feature-level fusion, score-level fusion and/or decision-level fusion.

36. The computing system of claim 34 wherein the biometric analysis further includes:

segmenting the image of the hand from an input image that includes the image of the hand and an image of at least part of a forearm.

37. The computer system of claim 34 wherein the biometric analysis further includes, before the plural feature parameters are determined:

smoothing of the segment images for the plural fingers, respectively.

38. A computing system that implements a biometric analysis tool, the computing system including:

a processing unit; and memory storing computer-executable instructions for causing the computing system to perform a method comprising:

performing biometric analysis on an image of a hand to produce plural feature parameters without requiring a particular orientation of the hand during image capture or for the biometric analysis, wherein the image further includes part of a forearm, and wherein the biometric analysis includes:

determining a silhouette representation from the image of the hand, wherein the silhouette representation further represents the part of the forearm;

segmenting the silhouette representation, including:
identifying a shape over a palm of the hand inside the silhouette representation;

using an intersection between the shape over the palm and the silhouette representation to identify the part of the forearm from the silhouette representation;

filtering out plural fingers of the hand from the silhouette representation to identify a segment image for the palm;

removing the palm from the silhouette representation to identify segment images for the plural fingers, respectively; and smoothing the segment images for the plural fingers; and determining the plural feature parameters from the segment image for the palm and the segment images for the plural fingers, respectively, each of the plural feature parameters indicating geometry of a different part among the palm and the plural fingers of the hand; and making an identity decision based at least in part on the plural feature parameters and stored descriptors representing one or more previously-analyzed hand images, wherein a different weight is associated with each of the plural feature parameters, respectively.

* * * * *